United States Patent
Willis et al.

(10) Patent No.: US 12,070,033 B1
(45) Date of Patent: Aug. 27, 2024

(54) AQUATIC HERBICIDE HAVING NON-HERBICIDAL FUNCTIONAL INGREDIENTS

(71) Applicant: SePRO Corporation, Carmel, IN (US)

(72) Inventors: Ben Willis, Whitakers, NC (US); Mark Heilman, Carmel, IN (US); West Bishop, Whitakers, NC (US); Erika Van Goethem, Whitakers, NC (US); Tyler Koschnick, Carmel, IN (US)

(73) Assignee: SePRO Corporation, Carmel, IN (US)

( * ) Notice: Subject to any disclaimer, the term of this patent is extended or adjusted under 35 U.S.C. 154(b) by 993 days.

(21) Appl. No.: 16/945,686

(22) Filed: Jul. 31, 2020

Related U.S. Application Data

(60) Provisional application No. 62/882,343, filed on Aug. 2, 2019.

(51) Int. Cl.
| | |
|---|---|
| *A01N 43/90* | (2006.01) |
| *A01N 59/16* | (2006.01) |
| A01N 25/30 | (2006.01) |
| A01N 25/32 | (2006.01) |
| A01N 43/08 | (2006.01) |
| A01N 59/20 | (2006.01) |

(52) U.S. Cl.
CPC ............ *A01N 43/90* (2013.01); *A01N 59/16* (2013.01); *A01N 25/30* (2013.01); *A01N 25/32* (2013.01); *A01N 43/08* (2013.01); *A01N 59/20* (2013.01)

(58) Field of Classification Search
CPC ................ A01N 43/90; A01N 59/16
See application file for complete search history.

(56) References Cited

U.S. PATENT DOCUMENTS

| | | |
|---|---|---|
| 3,461,163 A | 8/1969 | Boothe |
| 4,012,221 A | 3/1977 | Walker et al. |
| 4,049,545 A | 9/1977 | Horvath |
| 4,505,734 A | 3/1985 | Freedenthal et al. |
| 4,761,239 A | 8/1988 | Wardell |
| 4,882,070 A | 11/1989 | Wardell |
| 5,510,108 A | 4/1996 | Chouraqui |
| 5,541,150 A | 7/1996 | Garris |
| 6,120,698 A | 9/2000 | Rounds et al. |
| 6,248,369 B1 | 6/2001 | Nier et al. |
| 6,923,991 B2 | 8/2005 | McLaughlin |
| 8,716,183 B2 * | 5/2014 | Koschnick ............ A01N 43/54 504/128 |
| 10,111,436 B2 * | 10/2018 | Koschnick ............ A01N 43/90 |
| 10,123,531 B2 | 11/2018 | Schmidt et al. |
| 11,154,053 B2 | 10/2021 | Harel et al. |
| 2008/0041794 A1 | 2/2008 | Shah |
| 2010/0015245 A1 | 1/2010 | Harrison et al. |
| 2012/0149574 A1 | 6/2012 | Koschnick |
| 2013/0203600 A1 * | 8/2013 | Rees ............... A01N 57/12 504/239 |
| 2014/0042086 A1 | 2/2014 | Weber et al. |
| 2020/0367506 A1 | 11/2020 | Martinez-Gomez |
| 2021/0030000 A1 | 2/2021 | Robertson |

FOREIGN PATENT DOCUMENTS

| | | |
|---|---|---|
| AU | 689716 B2 | 4/1998 |
| CN | 114590918 A | 6/2022 |
| EP | 0991317 A2 | 4/2000 |
| GB | 1354620 A | 6/1974 |
| IN | 430428 | 5/2023 |
| WO | 2006076872 A1 | 7/2006 |

OTHER PUBLICATIONS

Mu, Kangguo, et al. "Effect of lanthanum on mycelium growth and some pathogenic factors." Journal of Rare Earths 24.4 (2006): 485-490. (Year: 2006).*

Weaver, M. A., et al. "Bioherbicides for weed control." Non-chemical weed management (2007): 93-110. (Year: 2007).*

Halterlein, A. J., and G. L. Sciumbato. "Use of Plant Desiccants to Control Cucumber Fruit Rot1." HortScience 16.2 (1981): 189-190. (Year: 1981).*

Wang, X., et al. "Lanthanum-and cerium-induced oxidative stress in submerged *Hydrilla verticillata* plants." Russian Journal of Plant Physiology 54 (2007): 693-697. (Year: 2007).*

Solitude Lake Management, "Improving Pond Water Quality Through Phosphorus Reduction," available online at https://www.solitudelakemanagement.com/blog/improving-pond-water-quality-through-phosphorus-reduction (last visited Jan. 2, 2024).

* cited by examiner

*Primary Examiner* — Abigail Vanhorn
(74) *Attorney, Agent, or Firm* — Koenig IP Works, PLLC; Katherine Koenig

(57) ABSTRACT

Aquatic herbicidal formulations generally including at least one active ingredient and at least one functional additive that promotes nutrient sequestration. For example, in one embodiment the at least one functional additive includes a nutrient-binding ingredient that binds certain nutrients (such as nitrogen, phosphorous, nitrogenous compounds, and/or phosphoric compounds) within the target plant, from an environment surrounding or proximate the target plant, and/or as those nutrients are released after the application of the active ingredient.

14 Claims, 12 Drawing Sheets

| Active Ingredients ||
|---|---|
| Active Ingredient (Herbicide) | Mode of Action (HRAC/WSSA Classification*) |
| Bispyribac-sodium | ALS inhibitor (B/2) |
| Imazamox | ALS inhibitor (B/2) |
| Imazapyr | ALS inhibitor (B/2) |
| Metsulfuron-methyl** | ALS inhibitor (B/2) |
| Penoxsulam | ALS inhibitor (B/2) |
| Diquat dibromide | PS1 electron diverter (D/22) |
| Carfentrazone-ethyl | PPO inhibitor (E/14) |
| Flumioxazin | PPO inhibitor (E/14) |
| Topramezone | HPPD inhibitor (F2/27) |
| Fluridone | Carotenoid biosynthesis inhibitor (F1/12) |
| Glyphosate | EPSP synthase inhibitor (G/9) |
| Florpyrauxifen-benzyl | Synthetic auxin (O/4) |
| Triclopyr | Synthetic auxin (O/4) |
| 2,4-D | Synthetic auxin (O/4) |
| Endothall | Protein phosphatase inhibitor (Z/27) |
| Fluazifop-P-butyl** | ACCase inhibitor (A/1) |
| Sethoxydim** | ACCase inhibitor (A/1) |
| Copper | Cell membrane disrupter (unclassified) |
| Diuron | Photosynthesis inhibitor (C2/7) |
| Acrolein | General cell toxicant (unclassified) |

* HRAC stands for Herbicide Resistance Action Committee. WSSA stands for Weed Science Society of America.
** Special Local Need registration or experimental use in some US states.

FIG. 1

| Functional Additives – Nutrient-Binding Ingredients ||
|---|---|
| Nutrient-Binding Ingredient | Associated Characteristic(s) |
| Aluminum sulfate | Flocculent, phosphorus (P) inactivation |
| Polyaluminum chloride | Flocculent, P inactivation |
| Aluminum chlorohydrate | Flocculent, P inactivation |
| Aluminum oxides | P and N inactivation |
| Alum (aluminum salts) | P and N inactivation |
| Aluminum hydroxide | P inactivation |
| Iron chloride | P inactivation |
| Iron oxides | P inactivation |
| Polyferric sulfate | P inactivation |
| Calcium chloride | P inactivation, water hardening |
| Calcium carbonate | P inactivation, water hardening |
| Calcium sulfate | P inactivation, water hardening |
| Calcium oxides | P inactivation, water hardening |
| Lanthanum | P inactivation |
| Lanthanum chlorides | P inactivation |
| Lanthanum oxides | P inactivation |
| Lanthanum-modified clay | P inactivation and cyanotoxin removal |
| Aluminum-modified clay | P inactivation and cyanotoxin removal |
| Iron-modified clay | P inactivation and cyanotoxin removal |
| Fly ash | Organic removal |
| Biochars | P and N inactivation |
| Activated carbon | P and N inactivation |
| Zeolite | $NH_4$ inactivation |
| Calcium silicate | P inactivation |
| Sorbulite | P inactivation |
| Polonite | P inactivation |
| Bauxite | P inactivation |
| Clays | P and $NH_4$ inactivation, flocculent |
| Chiton | Flocculent |
| Polymers | Flocculent, P and N removal |
| Resins | P and $NH_4$ inactivation |
| Proteins | P and N inactivation |
| Enzymes | P and N inactivation |
| Bacteria | P and N uptake |

*FIG. 2*

| Functional Additives – Adjuvants ||
|---|---|
| Adjuvant | Associated Characteristic(s) |
| Alkanoamides | Surfactant |
| Amine oxides | Surfactant |
| Ethoxylated primary and secondary alcohols | Surfactant |
| Ethoxylated alkylphenols | Surfactant |
| Ethoxylated fatty esters | Wetting agent |
| Sorbitan derivates | Emulsifier |
| Glycerol esters | Surfactant, emulsifier |
| Propoxylated and ethoxylated fatty acids | Surfactant |
| Alcohols | Surfactant, defoamer |
| Alkyl phenols | Surfactant |
| Alkyl glucoside glycol esters | Surfactant |
| Polymeric polysaccharides | Surfactant |
| Sophorolipids | Surfactant |
| Sulfates and sulfonates of ethoxylated alkylphenols | Surfactant |
| Trisiloxane polyethers | Surfactant |
| Polymeric surfactants | Surfactant |
| Ethoxylated amines and amides | Surfactant |
| Sulfosuccinates and sulfosuccinate derivates | Surfactant |
| Phosphate esters | Surfactant, buffer |
| Amine surfactants | Chelate, surfactant, buffer |
| Betaine derivatives | Surfactant |
| Crop oils and crop oil concentrates | Surfactant |
| Methylated seed oils | Sorbent polymer |
| Quaternary ammonia compounds | Surfactant |
| d-limonene | Surfactant, emulsifier |
| Peptides | Surfactant, emulsifier |
| Polyacrylamide | Flocculent |
| Polyacrylate | Sorbent polymer |

*FIG. 3*

AQUATIC HERBICIDE HAVING NON-HERBICIDAL FUNCTIONAL INGREDIENTS

CROSS-REFERENCE TO RELATED APPLICATIONS

This application claims priority to and the benefit of U.S. 62/882,343, filed Aug. 2, 2019, entitled AQUATIC HERBICIDE HAVING FUNCTIONAL INERT INGREDIENTS, the entirety of which is incorporated herein by reference.

GOVERNMENT RIGHTS STATEMENT

N/A.

TECHNICAL FIELD

This disclosure relates to herbicidal formulations generally including at least one aquatic-approved active ingredient and at least one functional additive (such as a non-herbicidal functional additive or ingredient) that promotes sequestration of nutrients and/or water quality enhancement in aquatic environments. For example, in one embodiment, the functional additive(s) include a nutrient-binding ingredient that binds phosphorous and/or nitrogen within the target organism (such as an aquatic macrophyte, referred to herein as a plant or aquatic plant) and/or from an environment surrounding or proximate the target organism as those nutrients are released from dying, herbicide-controlled plant tissue.

BACKGROUND

Rivers, springs, wetlands, lakes, ponds, other bodies of water, and surrounding environments are important ecosystems that provide environments for aquatic plant and animal life, provide a backdrop for recreational activities, allow shipping and transportation, enhance aesthetics, and affect quality of water used by humans for drinking, irrigation, and other uses. However, aquatic ecosystems are sensitive to nutrient imbalances and overloads, particularly of nutrients such as nitrogen and phosphorus.

Nitrogen and phosphorus are essential nutrients for growth of plants, algae, and bacteria. Too much of either, however, can severely disrupt an aquatic ecosystem. For example, nitrogen and/or phosphorus can enter an aquatic ecosystem from surrounding farmland, ranches, septic tanks, pollution, residential land, and other sources. As the amount of these nutrients in a body of water increases, so does growth of certain organisms such as aquatic plants, algae, and bacteria. High phosphorus levels can lead to harmful algal blooms (HABs), with many of these HAB species being capable of producing toxins that can be harmful to humans, pets, and wildlife. Rapid accumulation of aquatic plant or algal biomass can quickly cover the surface of water, not only making the body of water inaccessible or a poor habitat for birds, fish, and wildlife, but also critically depleting the dissolved oxygen content within the water. This, in turn, could make the water uninhabitable for fish and other aquatic fauna.

Nutrient release and recycling are concerns when applying herbicides to combat aquatic weeds and algae. For example, when an herbicide is applied to an aquatic plant, the herbicide rapidly and/or eventually causes death of the plant (or at least some amount of plant cells). As the integrity of plant cells is lost, such as when plant decomposes and cells rupture following the application of an herbicide, nutrients such as nitrogen and phosphorus are released, for example, into the water. In turn, other aquatic plants, algae, bacteria, and/or other microorganisms thrive on the increased nutrients and grow rapidly. This increased biomass uses more oxygen as it grows and increases biological oxygen demand, thereby not only crowding out but also suffocating other plants and animals. Additionally, as plants are controlled or naturally senesce more nutrients are released, further exacerbating the situation. Eventually, the water body supports less-abundant and less-diverse communities of aquatic flora and fauna and, in extreme cases, may sustain little plant or animal life.

SUMMARY

Some embodiments advantageously provide aquatic herbicidal formulations that generally include at least one active ingredient and at least one functional additive that promotes nutrient sequestration. In one embodiment, an aquatic herbicidal formulation comprises: at least one active ingredient; and at least one functional additive, the at least one functional additive being configured to bind to at least one of nitrogen and phosphorus.

In one aspect of the embodiment, the at least one active ingredient has herbicidal activity. In one aspect of the embodiment, the at least one active ingredient is selected from the group consisting of diquat dibromide, endothall, copper, carfentrazone-ethyl, flumioxazin, 2,4-D, triclopyr, glyphosate, imazapyr, imazamox, penoxsulam, fluridone, topramezone, bispyribac-sodium, sethoxydim, florpyrauxifen-benzyl, metsulfuron-methyl, fluazifop-P-butyl, diuron, acrolein, and combinations thereof.

In one aspect of the embodiment, the at least one active ingredient is formulated to injure aquatic plants.

In one aspect of the embodiment, the at least one non-herbicidal functional additive is selected from the group consisting of aluminum sulfate, polyaluminum chloride, aluminum chlorohydrate, aluminum oxides, alum, aluminum hydroxide, iron chloride, iron oxides, polyferric sulfate, calcium chloride, calcium carbonate, calcium sulfate, calcium oxides, lanthanum, lanthanum chloride, lanthanum, lanthanum oxides, lanthanum-modified clay, aluminum-modified clay, iron-modified clay, fly ash, biochars, activated carbon, zeolite, calcium silicate, sorbulite, polonite, bauxite, clays, chiton, polymers (such as polyacrylamides, polyamines, and/or polyacrylates), resins, proteins, enzymes, bacteria, and combinations thereof.

In one aspect of the embodiment, the at least one non-herbicidal functional additive further includes at least one adjuvant. In one aspect of the embodiment, the at least one adjuvant includes at least one surfactant.

In one aspect of the embodiment, the at least one surfactant is selected from the group consisting of at least one non-ionic surfactant, at least one anionic surfactant, at least one cationic surfactant, at least one amphoteric surfactant, and combinations thereof.

In one aspect of the embodiment, the at least one surfactant is selected from the group consisting of alkanoamides, amine oxides, ethoxylated primary and secondary alcohols, ethoxylated alkylphenols, ethoxylated fatty esters, sorbitan derivatives, glycerol esters, propoxylated and ethoxylated fatty acids, alcohols, alkyl phenols, alkyl glucoside glycol esters, polymeric polysaccharides, sulfates and sulfonates of ethoxylated alkylphenols, polymeric surfactants, ethoxylated amines and amides, sulfosuccinates and sulfosuccinate derivatives, phosphate esters, amine surfactants, betaine derivatives, and combinations thereof.

In one aspect of the embodiment, the at least one adjuvant is selected from the group consisting of crop oils, crop oil concentrates, methylated seed oils, quaternary ammonia compounds, d-limonene, peptides, and combinations thereof.

In one aspect of the embodiment, the at least one non-herbicidal functional additive is configured to bind at least one of nitrogen and phosphorus, and at least one of within a target organism and in water at least partially surrounding the target organism. In one aspect of the embodiment, the target organism is an aquatic plant. In one aspect of the embodiment, wherein the target aquatic plant is at least one of a vascular plant and a charophyte.

In one aspect of the embodiment, the at least one active ingredient is endothall and the at least one non-herbicidal functional additive is lanthanum. In one aspect of the embodiment, the aquatic herbicidal formulation includes approximately 40% endothall and approximately 28% lanthanum.

In one aspect of the embodiment, the at least one active ingredient is diquat dibromide and the at least one non-herbicidal functional additive is one of alum and lanthanum.

In one aspect of the embodiment, the at least one active ingredient is copper and the at least one non-herbicidal functional additive is alum.

In one embodiment, an herbicidal formulation comprises: an active ingredient having herbicidal activity against vascular aquatic plants; and at least one non-herbicidal functional additive, the at least one non-herbicidal functional additive including: at least one nutrient-binding ingredient, the at least one nutrient-binding ingredient being configured to bind at least one of nitrogen and phosphorus released from tissue of a vascular aquatic plant; and at least one adjuvant. In one aspect of the embodiment, the at least one adjuvant includes at least one surfactant.

In one embodiment, an aquatic herbicidal formulation comprises: at least one active ingredient having herbicidal activity against at least one target aquatic plant; and at least one non-herbicidal functional additive, the at least one non-herbicidal functional additive being configured to bind free reactive phosphorus released from the at least one target aquatic plant as a result of an application of the aquatic herbicidal formulation to the at least one target aquatic plant, the at least one non-herbicidal functional additive configured to bind at least 10% of the free reactive phosphorus released from the at least one target aquatic plant.

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein:

FIG. 1 is a chart showing exemplary active ingredients of an herbicidal formulation with approved, potential, or experimental use on aquatic sites and associated mechanisms of action, in accordance with the present disclosure;

FIG. 2 is a chart showing exemplary nutrient-binding ingredients of the herbicidal formulation and associated characteristics, in accordance with the present disclosure;

FIG. 3 is a chart showing exemplary adjuvants of the herbicidal formulation, in accordance with the present disclosure;

DETAILED DESCRIPTION

Figure 4:
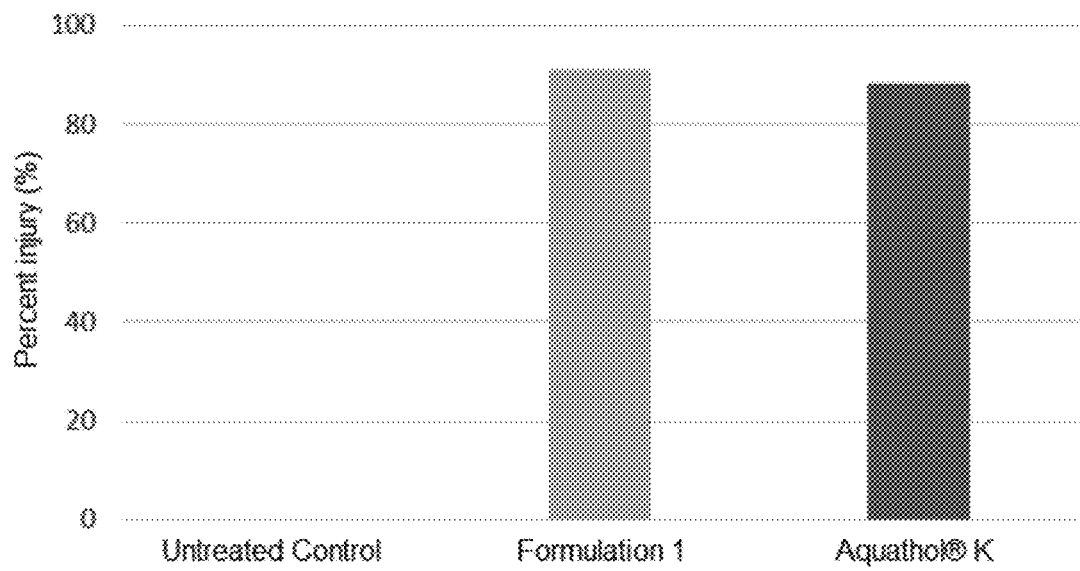
FIG. 4 shows a chart illustrating a comparison of plant injury caused in an untreated control, an aquatic herbicide formulation in accordance with the present disclosure, and a commercially available aquatic herbicide.

Before describing in detail exemplary embodiments, it is noted that the embodiments reside primarily in biocidal formulations, such as herbicidal formulations, that generally include at least one active ingredient and at least one functional additive (such as a non-herbicidal functional additive) that promotes nutrient sequestration. Accordingly, the system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

The present disclosure relates to aquatic herbicidal formulations that generally include at least one active ingredient and at least one functional additive that promotes nutrient sequestration. In one embodiment, an aquatic herbicidal formulation includes at least one active ingredient that has herbicidal activity and the at least one functional additive is a nutrient-binding ingredient. In one non-limiting example, the at least one functional additive is a functional additive that includes at least one nutrient-binding ingredient that is capable of binding nitrogen and/or phosphorus and that is not expected to display herbicidal activity (that is, cause injury to a treated plant). In a further non-limiting example, the nutrient-binding ingredient is capable of binding nitrogen and/or phosphorus within a target plant cell, proximate a target plant cell immediately after cell rupture, and/or within an area or environment proximate or surrounding a target plant cell after cell rupture following control of the plant(s) that is/are likely to make nutrients more available (that is, more available for harmful or nuisance algal and/or cyanobacterial growth). Thus, in some embodiments the active ingredient(s) in the aquatic herbicidal formulation disrupt the growth and development of a target plant and the non-herbicidal functional additive(s) (for example, nutrient-binding ingredient(s)) bind certain nutrients during application and/or that are released from cells of the plants as the disruption caused by the active ingredient(s) leads to cell degradation. In some embodiments, this functional additive is a nutrient-binding ingredient that binds all of the released nutrients. In some embodiments, the functional additive is a nutrient-binding ingredient that binds substantially all of the released nutrients. In some embodiments, the functional additive is a nutrient-binding ingredient binds at least a portion of the released nutrients. In some non-limiting examples, the nutrient binding ingredient binds free reactive phosphorus to yield a reduction of free reactive phosphorus in the water column of at least 10%, at least 20%, at least 50%, at least 60%, and at least 70%, In one embodiment, the at least one functional additive optionally further includes at least one adjuvant. In an exemplary method of use, the target plant is an aquatic plant and the aquatic herbicidal formulation is applied to a body of water containing the target aquatic plant, directly to the target aquatic plant, or to both the body of water and the target aquatic plant.

Referring now to FIG. 1, a chart of exemplary active ingredients and associated mechanisms of action is shown. In one embodiment, the at least one active ingredient includes at least one herbicide with approved (for example, approved by the United States Environmental Protection Agency (EPA)), potential, or experimental use for direct application into water and/or onto foliage of aquatic vegetation. For example, in one embodiment the at least one active ingredient includes diquat dibromide, endothall (dipotassium, acid, and amine salts), copper (when used as an herbicide, such as copper sulfate or various chelated forms including but not limited to complexes with ethylenediamine and triethanolamine), carfentrazone-ethyl, flumioxazin, 2,4-D (various forms approved for aquatic use, including acid, amine and choline salts and esters), triclopyr (acid, amine and choline salts), glyphosate, imazapyr, imazamox, penoxsulam, fluridone, topramezone, bispyribac-sodium, sethoxydim, florpyrauxifen-benzyl, metsulfuron-methyl, fluazifop-P-butyl, diuron, acrolein, and/or combinations thereof. Each of these active ingredients has herbicidal activity against one or more aquatic organisms and causes, as the active ingredient's mechanism of action and/or as an eventual consequence of a different mechanism of action, cell rupture and release of cellular contents, which may include nitrogen and/or phosphorus. In one embodiment, each of these active ingredients has herbicidal activity against target plant(s) including one or more aquatic plants, including vascular plants and some non-vascular plants (for example, charophytes). In some embodiments, target plants include, but are not limited to, tape grass (*Vallisneria americana*), coontail or hornwort (*Ceratophyllum demersum*), cat-tails (*Typha* spp.), arrowheads (*Sagittaria* spp.), hygrophila (*Hygrophila* spp.), water meal (*Wolffia columbiana*), Small duckweed (*Lemna valdiviana*), giant duckweed (*Spirodela polyrhiza*), hydrilla (*Hydrilla verticillata*), water hyacinth (*Eichhornia crassipes*), lagarosiphon (*Lagarosiphon major*), watermilfoils (*Myriophyllum* spp.), floating hearts (*Nymphoides* spp.), pondweeds (*Potamogeton* spp. and *Stuckenia* spp.), slender spikerush (*Eleocharis baldwinii*), rotala (*Rotala* spp.), phragmites (*Phragmites* spp.), water lettuce (*Pistia stratoides*), salvinia (*Salvinia* spp.), alligatorweed (*Alternanthera* spp.), and waterweeds (*Elodea* spp. and/or *Egeria* spp.).

Referring now to FIG. 2, a chart of exemplary nutrient-binding ingredients and associated characteristics is shown. In one embodiment, the at least one nutrient-binding ingredient includes at least one ingredient capable of binding one or more nutrients released from plants killed by the active ingredient(s), thereby making the nutrient(s) unavailable in an aquatic ecosystem. Thus, blooms of algae and aquatic plants are less likely to occur, which in turn reduces the likelihood and/or severity of eutrophication in a body of water. In one embodiment, the nutrient-binding ingredient(s) bind nutrients such as nitrogen and/or phosphorus within a target plant cell or tissue (or generally within the target plant), proximate a target plant/target plant cell or tissue immediately after cell rupture, and/or within an area or environment proximate or surrounding a target plant/target plant cell or tissue. For example, in one embodiment the active ingredient(s) cause, either directly or indirectly, cell rupture and release of nutrients such as nitrogen, phosphorus, and/or compounds thereof, and the nutrient-binding ingredient(s) act within the target plant or within the target plant cell/tissue to bind (and thereby sequester) nutrients as they are released from the ruptured cell(s). Thus, the nutrients, or at least some of the nutrients, released from the target plant cell(s) are rendered unavailable to other organisms before the nutrients are released from the target plant into the surrounding environment. Put another way, at least some of the nutrients released from an herbicide-controlled plant (that is, a plant with cell(s)/tissue(s) that have been affected, or killed, by application of an herbicide) will be bound by the aquatic herbicidal formulation before those nutrients are released into the surrounding or nearby body of water, thereby reducing the likelihood of an algal bloom.

Continuing to refer to FIG. 2, in one embodiment the at least one functional additive includes at least one nutrient-binding ingredient. In one embodiment, the nutrient-binding ingredient(s) are configured or operable to bind nitrogen, phosphorus, and/or compounds containing nitrogen or phosphorus. In some embodiments, the nutrient-binding ingredient(s) include one or more of aluminum sulfate, polyaluminum chloride, aluminum chlorohydrate, aluminum oxides, alum (aluminum salts), aluminum hydroxide, iron chloride, iron oxides, polyferric sulfate, calcium chloride, calcium carbonate, calcium sulfate, calcium oxides, lanthanum chloride, lanthanum oxides, lanthanum-modified clay, aluminum-modified clay, iron-modified clay, fly ash, biochars, activated carbon, zeolite, calcium silicate, sorbulite, polonite, bauxite, clays, chiton, polymers (such as polyacrylamides, polyamines, and/or polyacrylates), resins, proteins, enzymes (such as phytase, phosphohydrolytic, acid phosphatase, and alkaline phosphatase, which may promote release of nutrients), bacteria (such as *Azospirillum, Rhizobium, Bacillus, Azotobacter*, Actinobacteria, and/or Betaproteobacteria, which may be involved in mineralization or uptake), or combinations thereof. However, it is contemplated that other suitable functional additives may be used in addition to or instead of those discussed herein and shown in FIG. 2.

Referring now to FIG. 3, a chart of exemplary adjuvants is shown. In one embodiment, the adjuvant(s) enhance the nutrient-binding functionality of the nutrient-binding ingredient(s), such as by facilitating or improving localizing and/or targeting of the nutrients released from the target plant cells/tissues by the nutrient-binding ingredient(s). However, it will be understood that the adjuvant(s) may additionally or alternatively provide enhancements to the aquatic herbicidal formulation such as altering the physical characteristics of the aquatic herbicidal formulation, increase herbicidal activity/performance of the active ingredient(s), decrease photodegradation of the active ingredient(s), increase active ingredient penetration into the target plant (such as into an aquatic plant leaf), counteract potential issues with nutrients, minerals, or other compounds present in a body of water, etc.

Continuing to refer to FIG. 3, in one embodiment the at least one adjuvant includes at least one surfactant. Surfactants may help localize the functional additive(s) in the vicinity of the plant/alga to promote interaction with released nutrients. Surfactants may also facilitate membrane disruption of the plant/algal cell to allow more rapid release of nutrients for binding, enhance uptake of active ingredients to provide more rapid control and nutrient release, and enhance penetration of the functional additive(s) to promote binding within the plant cell matrix. Each of the at least one surfactant may be non-ionic, anionic, cationic, or amphoteric, and the aquatic herbicidal formulation may include more than one surfactant, as well as more than one type of surfactant. Non-limiting examples of suitable non-ionic surfactants include alkanoamides, amine oxides, ethoxylated primary and secondary alcohols, ethoxylated alkylphenols, ethoxylated fatty esters, sorbitan derivatives, glycerol esters, propoxylated and ethoxylated fatty acids, alcohols, alkyl phenols, alkyl glucoside glycol esters, polymeric polysaccharides, sophorolipids, sulfates and sulfonates of ethoxylated alkylphenols, trisiloxane, polyethers, and polymeric surfactants. Non-limiting examples of suitable anionic surfactants include ethoxylated amines and amides, sulfosuccinates and sulfosuccinate derivatives, phosphate esters, and polymeric surfactants. Non-limiting examples of suitable cationic surfactants include amine surfactants. Non-limiting examples of suitable amphoteric surfactants include betaine derivatives.

Continuing to refer to FIG. 3, in one embodiment the at least one adjuvant includes, either alone or in combination with one or more surfactants, crop oils, crop oil concentrates, methylated seed oils, quaternary ammonia compounds, d-limonene, peptides, polyacrylamide, polyacrylate, and combinations thereof. However, it is contemplated that other suitable adjuvants may be used in addition to or instead of those discussed herein and shown in FIG. 3. Further, in some embodiments, the at least one adjuvant may also function as a surfactant.

An aquatic herbicidal formulation in accordance with the present disclosure is configured or formulated to have herbicidal activity according to the active ingredient, and is further configured or formulated to bind nutrients released from the treated plant. Non-limiting examples of aquatic herbicidal formulations in accordance with the present disclosure are provided herein for illustration; however, it will be understood that other combinations of active ingredient(s), functional inert ingredient(s) (non-herbicidal functional additive(s)), and/or functional additive(s), as well the percentage of the aquatic herbicidal formulation made up by each, may be different than the non-limiting examples provided herein. For example, the aquatic herbicidal formulation may include: endothall (in some embodiments, dipotassium endothall) and lanthanum; endothall (in some embodiments, dipotassium endothall) and alum; diquat dibromide and alum; diquat dibromide and lanthanum; flumioxazin and alum; flumioxazin and lanthanum; copper and alum; copper and lanthanum, as well as any other combination of ingredients discussed herein and/or their equivalents. However, the combination of active ingredient(s) and functional additive(s), and concentrations thereof, should be chosen such that the resulting aquatic herbicidal formulation displays the desirable characteristics disclosed herein, namely, herbicidal activity and nutrient binding activity, as every combination of ingredients disclosed herein and all concentrations may not necessarily produce these results.

Example 1

In one non-limiting example, an aquatic herbicidal formulation in accordance with the present disclosure includes endothall (in one embodiment, dipotassium salt of endothall, or dipotassium endothall) as an active ingredient and lanthanum as a non-herbicidal functional additive, and is referred to herein as "Formulation 1." In Example 1, Formulation 1 is used to demonstrate the beneficial characteristics of an aquatic herbicidal formulation in accordance with the present disclosure.

Turning now to FIG. 4, the aquatic herbicidal formulation has the same or substantially the same herbicidal activity (that is, is at least as effective at causing plant cell injury) as a commercially available dipotassium endothall aquatic herbicide, such as Aquathol® K (UPL NA Inc., Pennsylvania, US), which does not include a non-herbicidal functional additive, when applied at the same active ingredient concentration. Aquathol® K is an EPA-registered 40.3% dipotassium salt of endothall liquid concentrate that is labeled for use on aquatic plants, including hydrilla. In one experiment, tips of hydrilla (*Hydrilla verticillata*) were harvested in good health, placed into water, and divided into three treatment groups: a first group exposed only to water (control group), a second group exposed to Formulation 1 (5 ppm dipotassium endothall), and a third group exposed to Aquathol® K (5 ppm dipotassium endothall). After two weeks of exposure, the hydrilla tips exposed to Formulation 1 and Aquathol® K were brown and breaking apart, whereas those in the control group showed no injury and continued to grow in their containers. Qualitative injury ratings of each hydrilla plant in each treatment group were averaged together and are shown in FIG. 4. An injury rating of 0% indicates healthy plants (no injury caused) and an injury rating of greater than 90% suggests herbicide control (injury caused by herbicidal activity).

Figure 5:
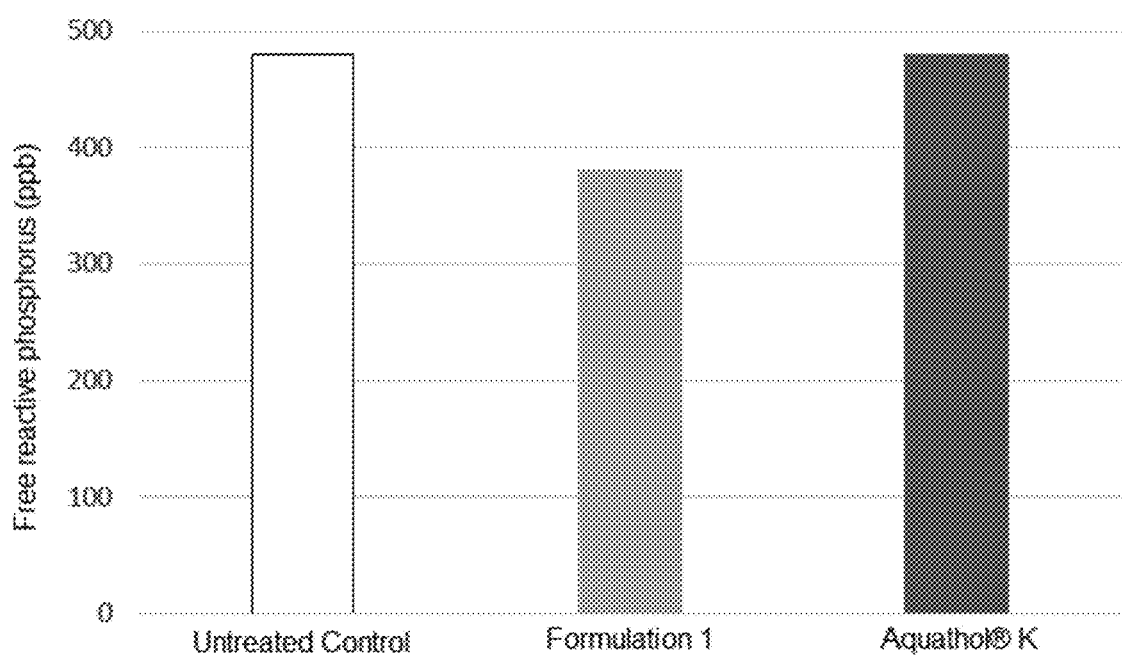
FIG. 5 shows a chart illustrating a comparison of free reactive phosphorus reduction in an untreated control, an aquatic herbicide formulation in accordance with the present disclosure, and a commercially available aquatic herbicide.

Turning now to FIG. 5, the aquatic herbicidal formulation is significantly more effective at binding nutrients in the water column than an untreated control and a commercially available dipotassium endothall aquatic herbicides, such as Aquathol® K. In one experiment, each of Formulation 1 (3.2 ppm dipotassium endothall) and Aquathol® K (3.2 ppm dipotassium endothall) was added to a solution having a target concentration of free reactive phosphorus of approximately 500 ppb free reactive phosphorus (+50 ppb) and the resulting reduction of free reactive phosphorus from the solution was measured. When plant tissue decomposes and releases nutrients such as phosphorus into the water column, the free reactive form of the nutrient is readily available to be used by other organisms for growth; therefore, it is desirable that the aquatic herbicidal formulation binds at least the free reactive form. As shown in FIG. 5, samples treated with Formulation 1 resulted in a decrease in free reactive phosphorus levels by 100 ppb (21%) compared to the untreated control. Further, the remaining free reactive phosphorus concentration was the same in untreated samples and samples treated with Aquathol® K. Thus, treatment with Formulation 1 produces a significant reduction in free reactive phosphorus, whereas treatment with Aquathol® K does not. This indicates that the aquatic herbicidal formulation more effectively binds free reactive phosphorus from a water column of an aquatic environment as phosphorus is released from a treated plant than do commercially available dipotassium endothall aquatic herbicides.

Figure 6:
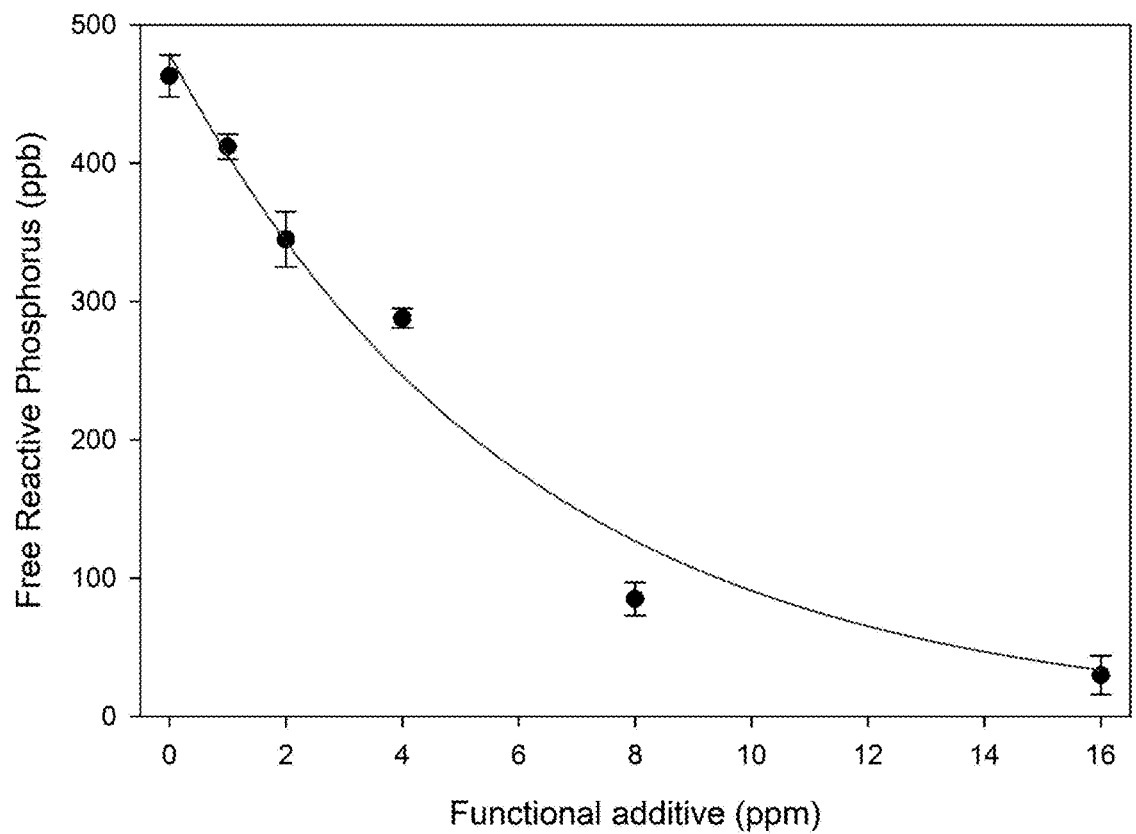
FIG. 6 shows a chart illustrating a relationship between reduction in free reactive phosphorus and concentration of a non-herbicidal functional additive in an aquatic herbicidal formulation in accordance with the present disclosure.

Turning now to FIG. 6, the aquatic herbicidal formulation becomes more effective at binding free reactive phosphorus from a water sample as the concentration of the non-herbicidal functional additive is increased. A solution having a target concentration of approximately 500 ppb free reactive phosphorus (+50 ppb) was divided into six treatment groups and treated with Formulation 1 having different concentrations of active ingredient (dipotassium endothall) and non-herbicidal functional additive (lanthanum), as shown in Table 1 below:

TABLE 1

| Group | Concentration of active ingredient (ppm) | Concentration of non-herbicidal functional additive (ppm) |
|---|---|---|
| 1 | 0 | 0 |
| 2 | 1.4 | 1 |
| 3 | 2.8 | 2 |
| 4 | 5.6 | 4 |
| 5 | 11 | 8 |
| 6 | 22 | 16 |

Samples were analyzed two days after treatment and the phosphorus concentration (ppb) was plotted against the concentration of functional additive (ppm). As shown, the results indicate that increasing the concentration of the non-herbicidal functional additive (such as lanthanum) in the aquatic herbicidal formulation results in increased removal of free reactive phosphorus from the solution, and indicates the aquatic herbicidal formulation is effective at binding free reactive phosphorus from the water column in an aquatic environment as phosphorus is released from treated plants and as the concentration of the non-herbicidal functional additive is increased.

Figure 7:
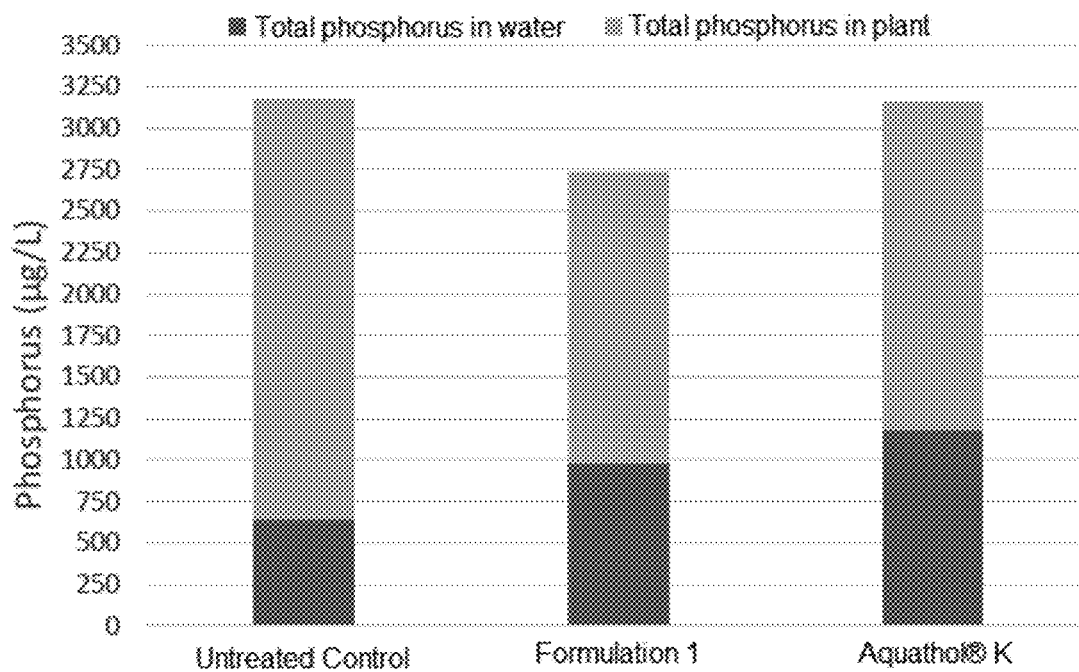
FIG. 7 shows a chart illustrating a comparison of in-plant total phosphorus and in-water total phosphorus in an untreated control, treatment with an aquatic herbicidal formulation in accordance with the present disclosure, and treatment with a commercially available aquatic herbicide.

Turning now to FIG. 7, treatment of aquatic weeds with the aquatic herbicidal formulation results in both an increased release of nutrients, such as phosphorus, from treated plants and a reduction from the water column of those nutrients released. In one experiment, total phosphorus was extracted from hydrilla and from water in which the hydrilla was located. In one test group, the hydrilla was untreated (control group). In a second test group, the hydrilla was treated with Formulation 1 (5 ppm dipotassium endothall) and, in a third test group, the hydrilla was treated with Aquathol® K (5 ppm dipotassium endothall). In the untreated control group, the plants remained healthy and pulled available phosphorus from the water column, resulting in a lower amount of phosphorus in the water (indicated by the darker shading at the bottom of each column) as compared to groups treated with Formulation 1 and Aquathol® K (as indicated by the lighter shading at the top of each column). Plants treated with Formulation 1 and with Aquathol® K showed significant injury. Injury releases phosphorus from the plant into the water and, therefore, the treated plants contained a lower amount of phosphorus than those of the untreated control group, suggesting that treatment with 5 ppm dipotassium endothall released approximately 27% of the plant's phosphorus into the water. Consequently, plants injured as a result of treatment with either Formulation 1 or Aquathol® K showed a lower in-plant amount of phosphorus and a higher in-water amount of phosphorus as compared to the untreated control group.

In one embodiment, a commercial formulation of the aquatic herbicidal formulation, having the ingredients of Formulation 1, may be a dry formulation (for example, a powder or granular formulation) or a liquid formulation. In one embodiment, a commercial formulation of the aquatic herbicidal formulation is a dry formulation that includes at least approximately 35% (+2%) dipotassium endothall by dry weight and at least approximately 20% (+2%) lanthanum by dry weight. In one embodiment, a commercial formulation of the aquatic herbicidal formulation is a dry formulation that includes dipotassium endothall in an amount of between approximately 5% (+1%) by dry weight and approximately 85% (+2%) by dry weight and lanthanum in an amount of between approximately 5% (+1%) by dry weight and approximately 80% (+2%) by dry weight; or that includes dipotassium endothall in an amount of between approximately 10% (+2%) by dry weight and approximately 65% (+2%) by dry weight and lanthanum in an amount of between approximately 15% (+2%) by dry weight and approximately 60% (+2%) by dry weight; or that includes dipotassium endothall in an amount of between approximately 20% (+2%) by dry weight and approximately 55% (+2%) by dry weight and lanthanum in an amount of between approximately 25% (+2%) by dry weight and approximately 50% (+2%) by dry weight. In one embodiment, a commercial formulation of the aquatic herbicidal formulation is a dry formulation that includes dipotassium endothall in an amount of approximately 40% (+1%) by dry weight and lanthanum in an amount of approximately 29% (+1%) by dry weight. In one embodiment, a commercial formulation of the aquatic herbicidal formulation is a dry formulation that includes dipotassium endothall in an amount of 40.3% by dry weight and lanthanum in an amount of approximately 28.9% by dry weight. In other embodiments, a commercial formulation of the aquatic herbicidal formulation is a liquid formulation that includes dipotassium endothall and lanthanum in comparable percentages by weight.

Example 2

In one experiment (Example 2), three non-limiting examples of an aquatic herbicidal formulation in accordance with the present disclosure were evaluated: a formulation including diquat dibromide as an active ingredient and alum as a non-herbicidal functional additive (referred to herein as "Formulation 2"); a formulation including diquat dibromide as an active ingredient and lanthanum as a non-herbicidal functional additive (referred to herein as "Formulation 3"); and a formulation including diquat dibromide as an active ingredient and alum as a non-herbicidal functional additive (referred to herein as "Formulation 4"). The concentrations of active ingredient and of non-herbicidal functional additive were different in each of Formulations 2-4. In Example 2, Formulations 2-4 are used to demonstrate the beneficial characteristics of an aquatic herbicidal formulation in accordance with the present disclosure, such as binding of nutrients.

Figure 8:
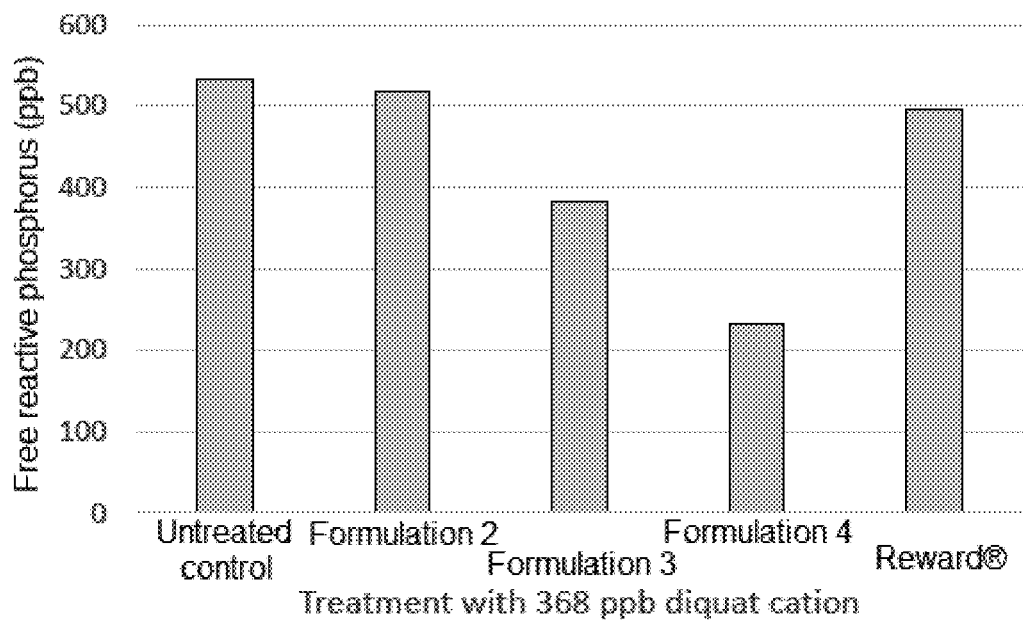
FIG. 8 shows a chart illustrating a comparison of free reactive phosphorus reduction in an untreated control, three formulations of an aquatic herbicide formulation in accordance with the present disclosure, and a commercially available aquatic herbicide.

Turning now to FIG. 8, the aquatic herbicidal formulation is significantly more effective at binding nutrients in the water column than an untreated control and a commercially available diquat dibromide aquatic herbicide, such as Reward® (Syngenta Crop Protection, LLC, North Carolina, US). Reward® is an EPA-registered 37.3% diquat dibromide liquid aquatic herbicide that is labeled for use on aquatic plants (weeds). In one experiment, each of Formulation 2, Formulation 3, Formulation 4, and Reward® were added to a solution having a target concentration of approximately 500 ppb free reactive phosphorus (+50 ppb), and this solution was also used as an untreated control for comparison. Although Formulations 2-4 each contained a different percentage of active ingredient, each was diluted accordingly to produce a stock solution having 368 ppb diquat cation. The stock solution for Reward® was also created to have 368 ppb diquat cation. Although the stock solutions of Formulations 2-4 each contained the same amount of diquat cation, they each contained a different amount of non-herbicidal functional additive, which amounts were based on the volume of each stock solution used and its percentage relative to the diquat concentration (Formulation 4 had the highest amount of alum and Formulation 2 had the lowest amount of alum). The resulting reduction of free reactive phosphorus from the solution was measured at three days after treatment using UV-vis spectroscopy and HACH Method 8048. The HACH Method 8048 reagents are capable of stripping bound phosphorus atoms from the non-herbicidal functional additive, which artificially reduces the observed phosphorus removal efficiency. To circumvent this interference, the samples were filtered prior to analysis to remove the phosphorus bound by the non-herbicidal functional additive and to leave behind the unbound phosphorus. As is shown in FIG. 8, free reactive phosphorus levels were 517 ppb, 382 ppb, and 233 ppb for Formulation 2, Formulation 3, and Formulation 4, respectively. Formulation 4 reduced the free reactive phosphorus in the water by 263 ppb compared to Reward®, resulting in a 53% reduction in free reactive phosphorus. Formulations 2 and 3, which had lower concentrations of alum than Formulation 4, showed smaller reductions in free reactive phosphorus; however, Formulation 3 did reduce the free reactive phosphorus by 114 ppb, or about 23%, compared to Reward®. Thus, the aquatic herbicidal formulation shows greater nutrient binding activity than commercially available diquat dibromide aquatic herbicides, provided that the aquatic herbicidal formulation includes adequate amounts of non-herbicidal functional additive.

In one embodiment, a commercial formulation of the aquatic herbicidal formulation, having the ingredients of any of Formulations 2-4 may be a dry formulation or a liquid formulation. In one embodiment, a commercial formulation of the aquatic herbicidal formulation, having the same ingredients of Formulation 2 or Formulation 4, is a liquid formulation that includes at least approximately 18% (±2%) diquat dibromide by weight and at least approximately 16% (±2%) alum by weight. In one embodiment, a commercial formulation of the aquatic herbicidal formulation, having the same ingredients of Formulation 2 or Formulation 4, is a liquid formulation that includes diquat dibromide in an amount of between approximately 0.3% (±0.02%) by weight and approximately 95% (±2%) by weight and alum in an amount of between approximately 2% (±0.2%) by weight and approximately 80% (±2%) by weight; or that includes diquat dibromide in an amount of between approximately 0.39% (±0.02%) by weight and approximately 70% (±2%) by weight and alum in an amount of between approximately 3% (±0.2%) by weight and approximately 60% (±2%) by weight; or that includes diquat dibromide in an amount of between approximately 0.391% (±0.01%) by weight and approximately 60% (±2%) by weight and alum in an amount of between approximately 4% (±0.2%) by weight and approximately 50% (±2%) by weight. In one embodiment, a commercial formulation of the aquatic herbicide formulation, having the same ingredients of Formulation 2, is a liquid formulation that includes diquat dibromide in an amount of approximately 18% (±2%) by weight and alum in an amount of approximately 16% (±2%) by weight. In one embodiment, a commercial formulation of the aquatic herbicidal formulation, having the same ingredients of Formulation 2, is a liquid formulation that includes diquat dibromide in an amount of 18.65% by weight and alum in an amount of 16% by weight. In one embodiment, a commercial formulation of the aquatic herbicidal formulation, having the same ingredients of Formulation 4, is a liquid formulation that includes diquat dibromide in an amount of 0.391% by weight and alum in an amount of 4.21% by weight. In other embodiments, a commercial formulation of the aquatic herbicidal formulation is a dry formulation that includes diquat dibromide and alum in comparable percentages by dry weight.

In one embodiment, a commercial formulation of the aquatic herbicidal formulation, having the same ingredients of Formulation 3, is a liquid formulation that includes at least approximately 7% (±2%) diquat dibromide by weight and at least approximately 7% (±2%) lanthanum by weight. In one embodiment, a commercial formulation of the aquatic herbicidal formulation, having the same ingredients of Formulation 3, is a liquid formulation that includes diquat dibromide in an amount of between approximately 3% (±0.2%) by weight and approximately 95% (±2%) by weight and lanthanum in an amount of between approximately 2% (±0.2%) by weight and approximately 80% (±2%) by weight; or that includes diquat dibromide in an amount of between approximately 6% (±2%) by weight and approximately 70% (±2%) by weight and lanthanum in an amount of between approximately 6% (±2%) by weight and approximately 60% (±2%) by weight; or that includes diquat dibromide in an amount of between approximately 7% (±2%) by weight and approximately 30% (±2%) by weight and lanthanum in an amount of between approximately 7% (±2%) by weight and approximately 30% (±2%) by weight. In one embodiment, a commercial formulation of the aquatic herbicide formulation, having the same ingredients as Formulation 3, is a liquid formulation that includes diquat dibromide in an amount of approximately 7% (±2%) by weight and lanthanum in an amount of approximately 7% (±2%) by weight. In one embodiment, a commercial formulation of the aquatic herbicidal formulation, having the same ingredients as Formulation 3, is a liquid formulation that includes diquat dibromide in an amount of 7.36% by weight and lanthanum in an amount of 7.36% by weight. In other embodiments, a commercial formulation of the aquatic herbicidal formulation is a dry formulation that includes diquat dibromide and lanthanum in comparable percentages by dry weight.

Example 3

In one non-limiting example, an aquatic herbicidal formulation in accordance with the present disclosure includes endothall (in some embodiments, dipotassium salt of endothall, or dipotassium endothall) as an active ingredient and lanthanum as a non-herbicidal functional additive, as is referred to herein as "Formulation 5." In Example 3, Formulation 5 is used to demonstrate the beneficial characteristics of an aquatic herbicidal formulation in accordance with the present disclosure.

Figure 9:
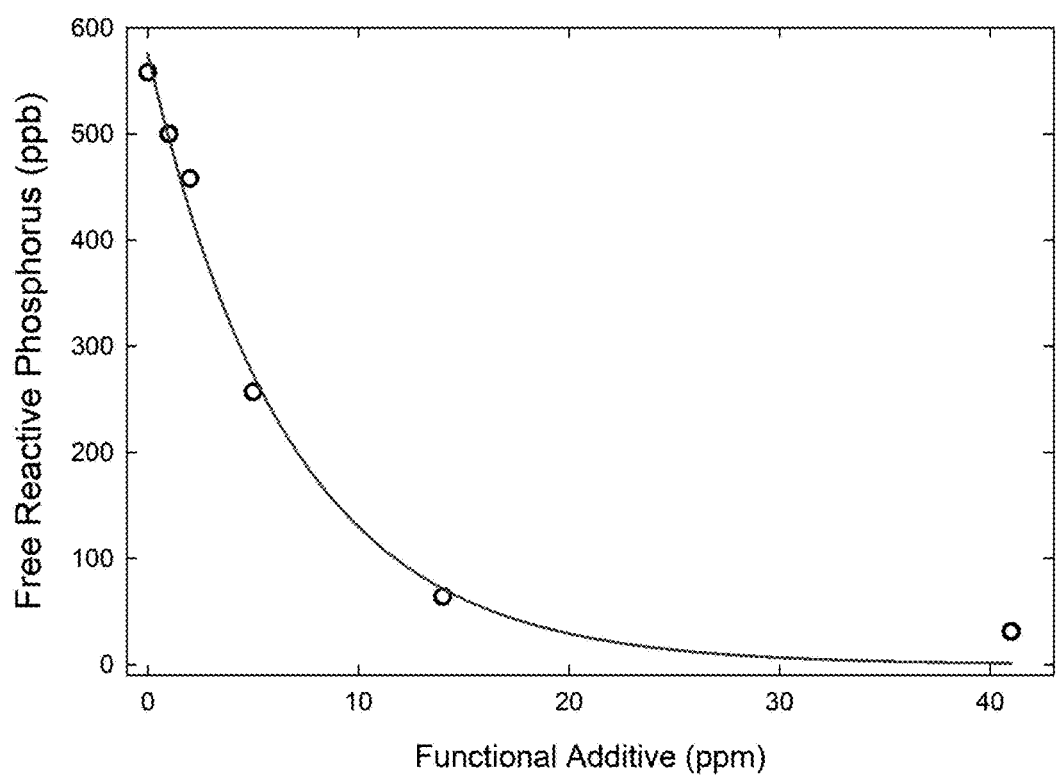
FIG. 9 shows a chart illustrating a relationship between reduction in free reactive phosphorus and concentration of a non-herbicidal functional additive in an aquatic herbicidal formulation in accordance with the present disclosure.

Turning now to FIG. 9, the aquatic herbicidal formulation becomes more effecting at binding free reactive phosphorus from a water sample as the concentration of the non-herbicidal functional additive is increased. In one experiment, a solution having a target concentration of approximately 500 ppb free reactive phosphorus (±50 ppb) was divided into six treatment groups and treated with Formulation 5 having different concentrations of active ingredient (endothall) and non-herbicidal functional additive (lanthanum), as shown in Table 2 below:

TABLE 2

| Group | Concentration of active ingredient (ppm) | Concentration of non-herbicidal functional additive (ppm) |
|---|---|---|
| 1 | 0 | 0 |
| 2 | 11 | 1 |
| 3 | 17 | 2 |

TABLE 2-continued

| Group | Concentration of active ingredient (ppm) | Concentration of non-herbicidal functional additive (ppm) |
|---|---|---|
| 4 | 50 | 5 |
| 5 | 149 | 14 |
| 6 | 448 | 41 |

Samples were analyzed one day after treatment. UV-vis spectrometry was used to measure the absorption of each sample, which was then converted to concentration of phosphorus remaining in each sample. The remaining phosphorus concentration (ppb) was plotted against the concentration of non-herbicidal functional additive (ppm), shown in FIG. 9. The data was fit to an exponential decay function. As shown, the results indicate that increasing the concentration of the non-herbicidal functional additive (such as lanthanum) in the aquatic herbicidal formulation results in increased removal of free reactive phosphorus from the solution, and indicate the aquatic herbicidal formulation is effective in binding free reaction phosphorus from the water column of an aquatic environment as phosphorus is released from a treated plant and as the concentration of the non-herbicidal functional additive is increased.

Figure 10:
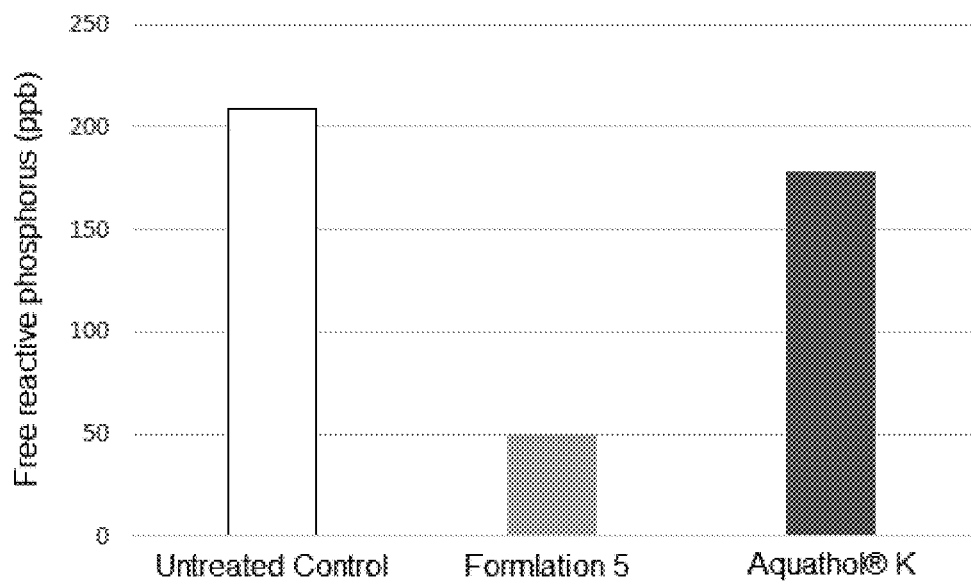
FIG. 10 shows a chart illustrating a comparison of free reactive phosphorus reduction in an untreated control, a formulation of an aquatic herbicide formulation in accordance with the present disclosure, and a commercially available aquatic herbicide.

Turning now to FIG. 10, the aquatic herbicidal formulation shows significantly greater nutrient binding functionality than the untreated control and Aquathol® K. In one experiment, each of Formulation 5 (201 ppm dipotassium endothall and 18 ppm lanthanum) and Aquathol® K (201 ppm dipotassium endothall) was added to a solution having a target concentration of approximately 500 ppb free reactive phosphorus (±50 ppb). Samples were analyzed four hours after treatment, and the high rate of Formulation 5 and Aquathol® K were used to demonstrate strong inactivation of free reactive phosphorus over the short four-hour exposure period. As shown in FIG. 10, samples treated with Formulation 5 resulted in a decrease in free reactive phosphorus levels by 160 ppb (77%) compared to the untreated control. Further, the remaining free reactive phosphorus concentration was not significantly different between untreated samples and samples treated with Aquathol® K. Thus, treatment with Formulation 5 produces a significant reduction in free reactive phosphorus, whereas treatment with Aquathol® K does not.

In one embodiment, a commercial formulation of the aquatic herbicidal formulation, having the ingredients of Formulation 5, may be a dry formulation (for example, a powder or granular formulation) or a liquid formulation. In one embodiment, a commercial formulation of the aquatic herbicidal formulation is a liquid formulation that includes at least approximately 15% (±2%) dipotassium endothall by weight and at least approximately 1% (±0.5%) lanthanum by weight. In one embodiment, a commercial formulation of the aquatic herbicidal formulation is a liquid formulation that includes dipotassium endothall in an amount of at least approximately 15% (±2%) by weight and lanthanum in an amount of at least approximately 1% (±0.5%) by weight. In one embodiment, a commercial formulation of the aquatic herbicidal formulation is a liquid formulation that includes dipotassium endothall in an amount of between approximately 5% (±2%) by weight and approximately 85% (±2%) by weight and lanthanum in an amount of between approximately 0.1% (±0.02%) by weight and approximately 80% (±2%) by weight; or that includes dipotassium endothall in an amount of between approximately 10% (±2%) by weight and approximately 65% (±2%) by weight and lanthanum in an amount of between approximately 0.5% (±0.02%) by weight and approximately 60% (±1%) by weight; or that includes dipotassium endothall in an amount of between approximately 20% (±2%) by weight and approximately 55% (±2%) by weight and lanthanum in an amount of between approximately 1% (±0.02%) by weight and approximately 50% (±2%) by weight. In one embodiment, a commercial formulation of the aquatic herbicidal formulation is a liquid formulation that includes dipotassium endothall in an amount of approximately 20% (±1%) by weight and lanthanum in an amount of approximately 1.5% (±0.02%) by weight. In one embodiment, a commercial formulation of the aquatic herbicidal formulation is a liquid formulation that includes dipotassium endothall in an amount of 20.15% by weight and lanthanum in an amount of approximately 1.7% by weight. In other embodiments, a commercial formulation of the aquatic herbicidal formulation is a dry formulation that includes dipotassium endothall and lanthanum in comparable percentages by dry weight.

Example 4

In one non-limiting example, an aquatic herbicidal formulation in accordance with the present disclosure includes copper (copper ethylenediamine complex) as an active ingredient and alum as a non-herbicidal functional additive, and is referred to herein as "Formulation 6." In Example 4, Formulation 6 is used to demonstrate the beneficial characteristics of an aquatic herbicidal formulation in accordance with the present disclosure.

The aquatic herbicidal formulation has the same or substantially the same herbicidal activity as, and is more effective at binding nutrients from, the water column than a commercially available copper (copper ethylenediamine) aquatic herbicide, such as Komeen® Crystal (SePRO Corporation, Indiana, US), which does not include a non-herbicidal functional additive, when applied at the same active ingredient concentration. Komeen® Crystal is an EPA-registered 50% coper ethylenediamine granular herbicide that is labeled for use on aquatic plants, including hydrilla. In one experiment, tips of hydrilla were treated with Formulation 6 (1 ppm copper) and with Komeen® Crystal (1 ppm copper), with treatment with Komeen® Crystal serving as the control group, to determine whether Formulation 6 caused plant injury. At 14 days after treatment, it was observed that both Formulation 6 and Komeen® Crystal caused substantial plant injury, and it was further observed that the samples treated with Formulation 6 had lower algal growth than those treated with Komeen® Crystal, which suggests more nutrients released from the plant were bound by Formulation 6 than by Komeen® Crystal.

Figure 11:
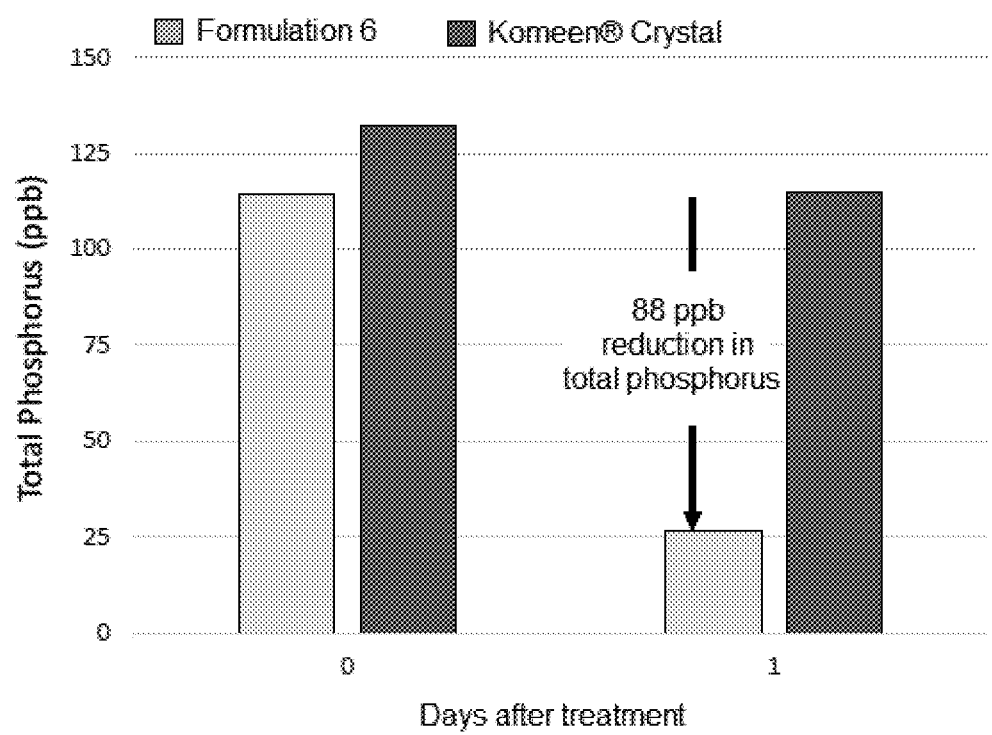
FIG. 11 shows a chart illustrating a comparison of total phosphorus reduction by a formulation of an aquatic herbicide formulation in accordance with the present disclosure and a commercially available aquatic herbicide over time.

Turning now to FIG. 11, the aquatic herbicidal formulation is significantly more effective at binding total phosphorus in the water column than a commercially available copper aquatic herbicide, such as Komeen® Crystal. In one experiment, tips of hydrilla were harvested in good health, placed into water, and divided into two treatment groups: a first group treated with Komeen® Crystal (1 ppm copper) and a second group treated with Formulation 6 (1 ppm copper). Using UV-vis spectroscopy and HACH Method 8048, total phosphorus was measured from each water sample at zero days after treatment (that is, as a pretreatment baseline) and at one day after treatment. The samples were filtered prior to analysis, as in Example 2, to remove the phosphorus bound by the non-herbicidal functional additive and to leave behind the unbound phosphorus. These measurements were then used to evaluate total phosphorus reduction over time. As shown in FIG. 11, pretreatment total phosphorus levels were 114 ppb and 132 ppb for Formulation 6 and Komeen® Crystal, respectively. At one day after treatment, it was observed that Formulation 6 reduced the total phosphorus in the water to 27 ppb, which is a 77% reduction. In contrast, only a 13% reduction in total phosphorus was observed in samples treated with Komeen® Crystal. Thus, the aquatic herbicide formulation not only significantly reduces total phosphorus in water within the first 24 hours, but also shows greater reduction than commercially available copper aquatic herbicides. This indicates that the aquatic herbicidal formulation more quickly and effectively binds free reactive phosphorus in the water column of an aquatic environment when phosphorus is released from a treated plant than commercially available copper aquatic herbicides.

Figure 12:
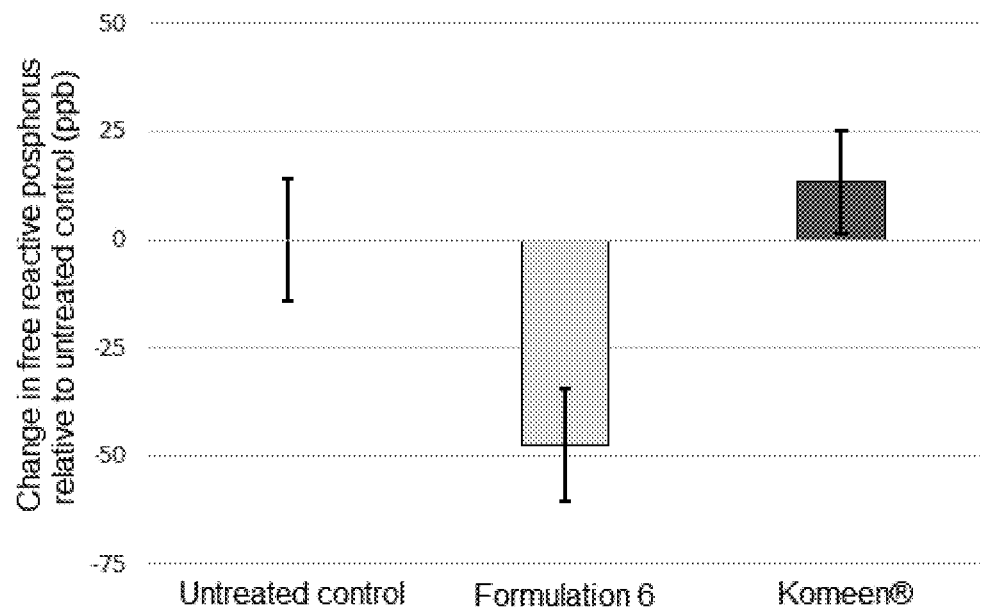
FIG. 12 shows a chart illustrating a comparison of free reactive phosphorus reduction in an untreated control, a formulation of an aquatic herbicide formulation in accordance with the present disclosure, and a commercially available aquatic herbicide.

Turning now to FIG. 12, the aquatic herbicidal formulation is significantly more effective at binding free reactive phosphorus in the water column than a commercially available copper aquatic herbicide, such as Komeen® (SePRO Corporation, Indiana, US). Komeen® is an EPA-registered 22.9% coper ethylenediamine liquid herbicide that is labeled for use on aquatic plants, including hydrilla. In one experiment, each of Formulation 6 (1 ppm copper) and Komeen® (1 ppm copper) were added to a solution having a target concentration of approximately 500 ppb free reactive phosphorus (±50 ppb). The free reactive phosphorus was then measured at three days after treatment and compared to an untreated control (control group). As shown in FIG. 12, Formulation 6 reduced the amount of free reactive phosphorus by about 44-88 ppb (about 11%), whereas treatment with Komeen® yielded approximately the same reduction as the untreated control group. Thus, the aquatic herbicidal formulation is more effective at reducing the amount of free reactive phosphorus in a water column than are other commercially available copper aquatic herbicides.

In one embodiment, a commercial formulation of the aquatic herbicidal formulation, having the ingredients of Formulation 6, may be a dry formulation or a liquid formulation. In one embodiment, a commercial formulation of the aquatic herbicidal formulation is a dry formulation that includes copper by dry weight and alum by dry weight. In one embodiment, a commercial formulation of the aquatic herbicidal formulation is a dry formulation that includes copper in an amount of between approximately 2% (±0.2%) by dry weight and approximately 75% (±2%) by dry weight and alum in an amount of between approximately 0.5% (±0.1%) by dry weight and approximately 80% (±2%) by dry weight; or that includes copper in an amount of between approximately 5% (±2%) by dry weight and approximately 65% (±2%) by dry weight and alum in an amount of between approximately 5% (±1%) by dry weight and approximately 60% (±2%) by dry weight. In other embodiments, a commercial formulation of the aquatic herbicidal formulation is a liquid formulation that includes copper and alum in comparable percentages by weight.

Example 5

In one non-limiting example, an aquatic herbicidal formulation in accordance with the present disclosure includes fluridone as an active ingredient and lanthanum as a non-herbicidal functional additive, as is referred to herein as "Formulation 7." In example 5, Formulation 7 is used to demonstrate the beneficial characteristics of an aquatic herbicidal formulation in accordance with the present disclosure.

Figure 13:
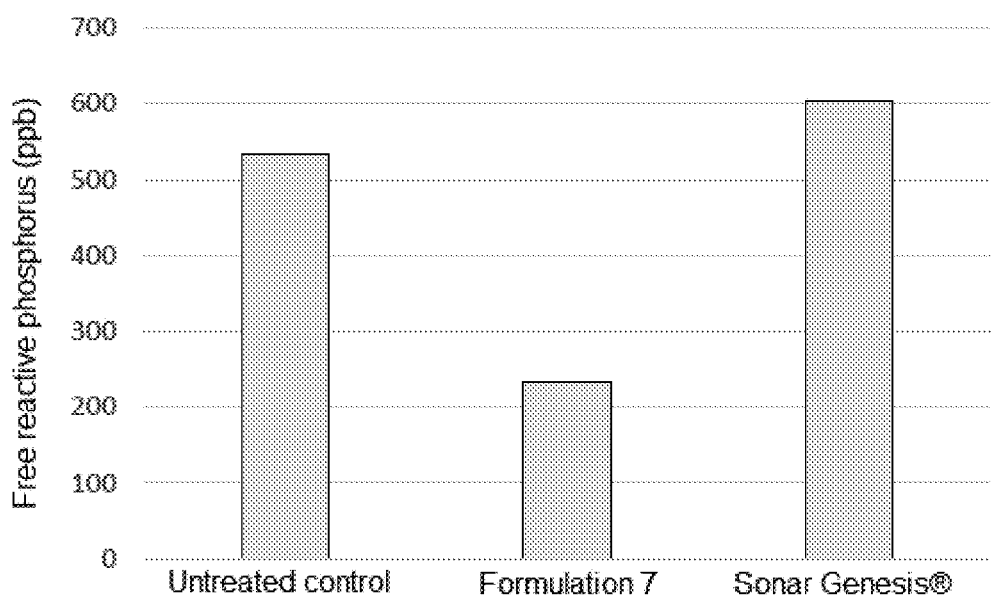
FIG. 13 shows a chart illustrating a comparison of free reactive phosphorus reduction in an untreated control, a formulation of an aquatic herbicide formulation in accordance with the present disclosure, and a commercially available aquatic herbicide.

Turning now to FIG. 13, the aquatic herbicidal formulation is significantly more effective at binding free reactive phosphorus in the water column than a commercially available fluridone aquatic herbicide, such as Sonar Genesis® (SePRO Corporation, Indiana, US). Sonar Genesis® is a 6.3% fluridone liquid herbicide that is labeled for use on aquatic plants (weeds). In one experiment, each of Formulation 7 (50 ppb fluridone) and Sonar Genesis® (50 ppb fluridone) were added to a solution having a target concentration of approximately 500 ppb phosphorus (=50 ppb). The free reactive phosphorus was then measured at three days after treatment and compared to an untreated control (control group). As shown in FIG. 13, Formulation 7 reduced the amount of free reactive phosphorus by about 370 ppb, resulting in a 60% reduction in free reactive phosphorus. The group treated with Sonar Genesis® showed approximately the same free reactive phosphorus levels as the untreated control group. Thus, the aquatic herbicidal formulation is more effective at reducing the amount of free reactive phosphorus in the solution, and indicates the aquatic herbicidal formulation more effectively binds free reactive phosphorus in a water column of an aquatic environment as phosphorus is released from a treated plant than are other commercially available fluridone aquatic herbicides.

In one embodiment, a commercial formulation of the aquatic herbicidal formulation, having the ingredients of Formulation 7, may be a dry formulation or a liquid formulation. In one embodiment, a commercial formulation of the aquatic herbicidal formulation is a liquid formulation that includes at least approximately 0.4% (±0.05%) fluridone by weight and at least approximately 20% (±2%) lanthanum by weight. In one embodiment, a commercial formulation of the aquatic herbicidal formulation is a liquid formulation that includes fluridone in an amount of between approximately 0.05% (±0.01%) by weight and approximately 95% (±2%) by weight and lanthanum in an amount of between approximately 0.5% (±0.1%) by weight and approximately 80% (±2%) by weight; or that includes fluridone in an amount of between approximately 0.1% (±0.05%) by weight and approximately 50% (±2%) by weight and lanthanum in an amount of between approximately 5% (±1%) by weight and approximately 60% (±2%) by weight; or that includes fluridone in an amount of between approximately 0.3% (±0.05%) by weight and approximately 75% (±2%) by weight and lanthanum in an amount of between approximately 10% (±1%) by weight and approximately 50% (±2%) by weight. In one embodiment, a commercial formulation of the aquatic herbicidal formulation is a liquid formulation that includes fluridone in an amount of approximately 0.4% (±0.05%) by weight and lanthanum in an amount of approximately 20% (±1%) by weight. In one embodiment, a commercial formulation of the aquatic herbicidal formulation is a liquid formulation that includes fluridone in an amount of 0.4297% by weight and lanthanum in an amount of approximately 20.95% by weight. In other embodiments, a commercial formulation of the aquatic herbicidal formulation is a dry formulation that includes fluridone and lanthanum in comparable percentages by dry weight.

Example 6

In one non-limiting example, an aquatic herbicidal formulation in accordance with the present disclosure includes flumioxazin as an active ingredient and alum as a non-herbicidal functional additive, and is referred to herein as "Formulation 8." In Example 6, Formulation 8 is used as a contrasting example to demonstrate that the active ingredient and non-herbicidal functional additive should be chosen such that the resulting aquatic herbicidal formulation displays the desirable characteristics disclosed herein, namely, herbicidal activity and nutrient binding activity, and based at least in part on the target plant species. For example, not all active ingredients show the same effective in causing injury to a particular plant species in all conditions (for example, flumioxazin may not be as effective in controlling hydrilla as endothall or diquat, depending on the pH of the water, time of day, biomass to be controlled, etc.). When an active ingredient that is very effective in controlling a particular target plant species is used, that target plant species may be significantly damaged by application of the aquatic herbicidal formulation and, therefore, may release a larger volume of nutrients into the water column than would a less effective active ingredient. Consequently, a non-herbicidal functional additive should be used that shows strong nutrient-binding activity, and in a sufficient concentration, to compensate for the increased release of nutrients. Further, less nutrient binding may occur (or be observed), regardless of the non-herbicidal functional additive used, when an active ingredient that is less effective on the target plant species is used. Similarly, two formulations having the same type and/or concentration of non-herbicidal functional additive may show different nutrient-binding efficacies if different active ingredients are used (for example, see FIG. 17). Additionally, any contaminants, additives, or other ingredients added to a commercially available source of active ingredient should be taken into account.

Figure 14:
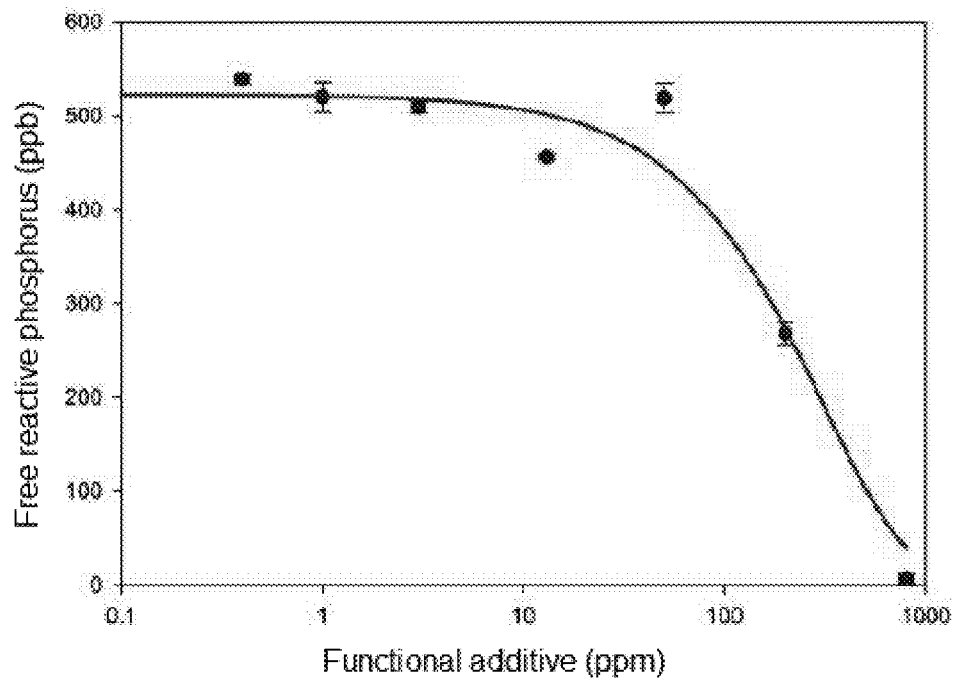
FIG. 14 shows a chart illustrating a relationship between reduction in free reactive phosphorus and concentration of a non-herbicidal functional additive in an aquatic herbicidal formulation in accordance with the present disclosure.
Figure 15:
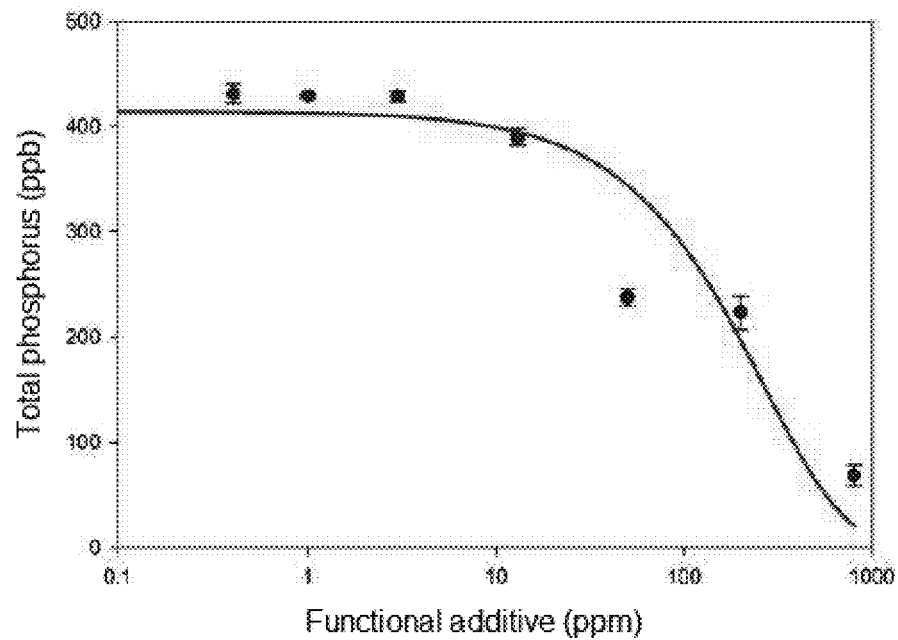
FIG. 15 shows a chart illustrating a relationship between reduction in total phosphorus and concentration of a non-herbicidal functional additive in an aquatic herbicidal formulation in accordance with the present disclosure.

Turning now to FIGS. 14 and 15, the aquatic herbicidal formulation becomes more effective at binding free reactive phosphorus (FIG. 14) and total phosphorus (FIG. 15) as the concentration of the non-herbicidal functional additive is increased. In one experiment, a (filtered) solution having a target concentration of approximately 500 ppb free reactive phosphorus (±50 ppb) was divided into seven treatment groups and treated with Formulation 8 having different concentrations of active ingredient and non-herbicidal functional additive: a first untreated group (control group); a second group treated with Formulation 8 having 0.2 ppm flumioxazin and 0.4 ppm alum; a third group treated with Formulation 8 having 0.4 ppm flumioxazin and 1 ppm alum; a fourth group treated with Formulation 8 having 1.6 ppm flumioxazin 3 ppm alum; a fifth group treated with Formulation 8 having 6.4 ppm flumioxazin and 13 ppm alum; a sixth group treated with Formulation 8 having 25.6 ppm flumioxazin and 50 ppm alum; a seventh group treated with Formulation 8 having 102 ppm flumioxazin and 200 ppm alum; and an eighth group treated with Formulation 8 having 410 ppm flumioxazin and 804 ppm alum. At seven days after treatment, the free reactive phosphorus concentration of each treatment was measured using UV-vis spectroscopy and HACH Method 8048, and results are shown in FIG. 14. This experiment was repeated and the total phosphorus concentration of each treatment was similarly measured at 12 days after treatment, and results are shown in FIG. 15. As shown, the results indicate that increasing the concentration of the non-herbicidal functional additive (such as alum) in the aquatic herbicidal formulation results in increased removal of free reactive phosphorus and total phosphorus from the water column.

Figure 16:
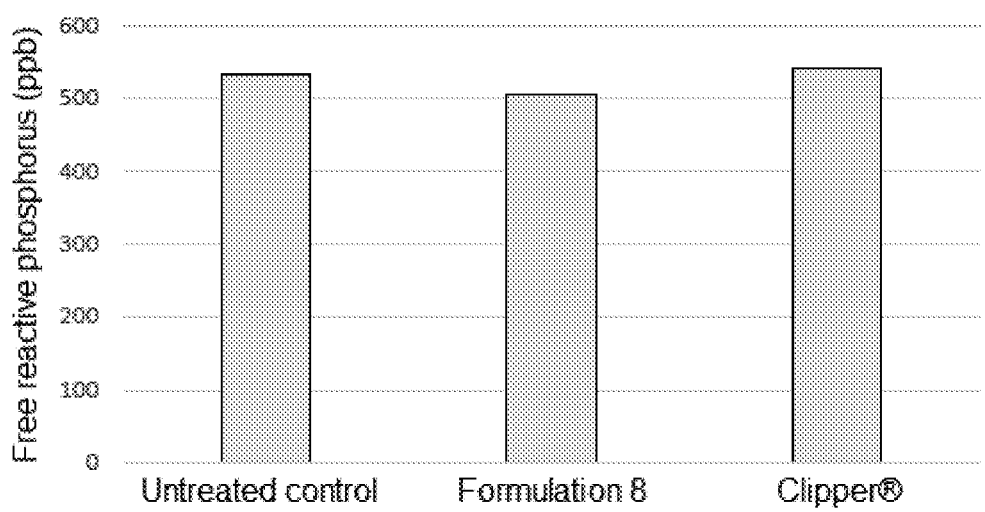
FIG. 16 shows a chart illustrating a comparison of free reactive phosphorus in an untreated control, a formulation of an aquatic herbicidal formulation in accordance with the present disclosure, and a commercially available aquatic herbicide.

Turning now to FIG. 16, it is suspected that additives in commercially available sources of active ingredients and/or other factors may affect nutrient binding capabilities of the aquatic herbicidal formulation. In one experiment, free reactive phosphorus removal from a (filtered) solution having a target concentration of approximately 500 ppb free reactive phosphorus (±50 ppb) was compared between Formulation 8 (400 ppb flumioxazin), a commercially available flumioxazin aquatic herbicide, Clipper® (Valent U.S.A. Corporation, California, US), and an untreated control (control group). Clipper® is an EPA-registered 51% flumioxazin granular herbicide and is labelled for use on aquatic plants (weeds). The free reactive phosphorus in each sample was measured at three days after treatment using UV-vis spectrometry and HACH Method 8048. As shown in FIG. 16, treatment with Formulation 8 reduced the free reactive phosphorus in the water by 37 ppb compared to the sample treated with Clipper®, resulting in a 7% reduction in free reactive phosphorus. The sample treated with Clipper® showed approximately the same free reactive phosphorus levels as the untreated control group. It was suspected that co-formulants (additives, additional ingredients, etc.) in currently available flumioxazin sources reduces phosphorus binding efficiency. Thus, unique alternative compositions of the aquatic herbicidal formulation should be made to ensure maximum phosphorus binding efficiency.

Figure 17:
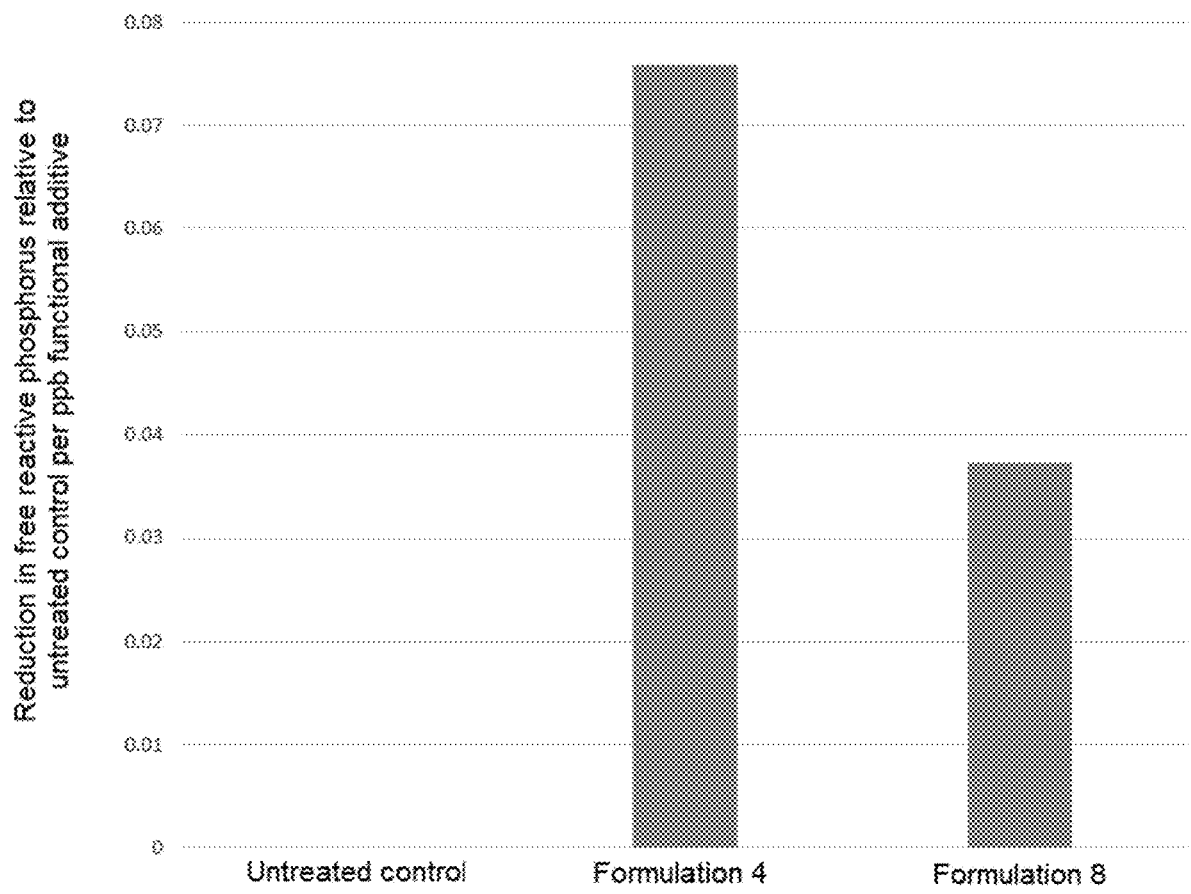
FIG. 17 shows a chart illustrating a comparison of free reactive phosphorus reduction between an untreated control, a first formulation of the aquatic herbicidal formulation, and a second formulation of the aquatic herbicidal formulation, in accordance with the present disclosure.

Turning now to FIG. 17, two formulations having the same type of non-herbicidal functional additive may have different nutrient binding efficacies depending on the active ingredient used. In one experiment, the nutrient-binding activity of an untreated control (control group), Formulation 4 (which included diquat dibromide as the active ingredient and alum as the non-herbicidal functional additive), and Formulation 8 (which included flumioxazin as the active ingredient and alum as the non-herbicidal functional additive) were compared. The stock solution of Formulation 4 included approximately 784 ppb alum and the stock solution of Formulation 8 included approximately 3962 ppb alum. It was found that Formulation 8 removed nearly zero ppb of free reactive phosphorus from the solution, whereas Formulation 4 removed approximately 300 ppb of free reactive phosphorus from the solution. Each value of change in free reactive phosphorus was scaled according to the concentration of alum in each treatment, which showed a 0.08 ppb free reactive phosphorus reduction for each 1 ppb alum in groups treated with Formulation 4 and a 0.04 ppb free reactive phosphorus reduction for each 1 ppb alum in groups treated with Formulation 8. This indicates that Formulation 8 is approximately half as effective in binding free reactive phosphorus from the water column of an aquatic environment as phosphorus is released from a treated plant as is Formulation 4, even though both formulations include the same non-herbicidal functional additive. Thus, a unique composition of an aquatic herbicidal formulation that shows desired nutrient-binding activity may not always result simply by combining a known active ingredient and a known nutrient-binding ingredient (non-herbicidal functional additive).

In one embodiment, a commercial formulation of the aquatic herbicidal formulation, having the ingredients of Formulation 8, may be a dry formulation or a liquid formulation. In one embodiment, a commercial formulation of the aquatic herbicidal formulation is a dry formulation that includes at least approximately 25% (±2%) flumioxazin by dry weight and at least approximately 50% (±2%) alum by dry weight. In one embodiment, a commercial formulation of the aquatic herbicidal formulation is a dry formulation that includes flumioxazin in an amount of between approximately 10% (±2%) by dry weight and approximately 95% (±2%) by dry weight and alum in an amount of between approximately 10% (±2%) by dry weight and approximately 90% (±2%) by dry weight; or that includes flumioxazin in an amount of between approximately 15% (±2%) by dry weight and approximately 75% (±2%) by dry weight and alum in an amount of between approximately 20% (±2%) by dry weight and approximately 80% (±2%) by dry weight; or that includes flumioxazin in an amount of between approximately 20% (±2%) by dry weight and approximately 60% (±2%) by dry weight and alum in an amount of between approximately 30% (±2%) by dry weight and approximately 60% (±2%) by dry weight. In one embodiment, a commercial formulation of the aquatic herbicidal formulation is a dry formulation that includes flumioxazin in an amount of approximately 25% (±2%) by dry weight and alum in an amount of approximately 50% (±2%) by dry weight. In one embodiment, a commercial formulation of the aquatic herbicidal formulation is a dry formulation that includes flumioxazin in an amount of 25.5% by dry weight and alum in an amount of approximately 50% by dry weight. In other embodiments, a commercial formulation of the aquatic herbicidal formulation is a liquid formulation that includes flumioxazin and alum in comparable percentages by weight.

Embodiments

Embodiment 1: An aquatic herbicidal formulation that comprises: at least one active ingredient; and at least one functional additive (non-herbicidal functional additive), the at least one functional additive being configured to bind to at least one of nitrogen and phosphorus.

Embodiment 2: The aquatic herbicidal formulation of Embodiment 1, wherein the at least one active ingredient has herbicidal activity.

Embodiment 3: The aquatic herbicidal formulation of Embodiment 1 or 2, wherein the at least one active ingredient is selected from the group consisting of diquat dibromide, endothall, copper, carfentrazone-ethyl, flumioxazin, 2,4-D, triclopyr, glyphosate, imazapyr, imazamox, penoxsulam, fluridone, topramezone, bispyribac-sodium, sethoxydim, florpyrauxifen-benzyl, metsulfuron-methyl, fluazifop-P-butyl, diuron, acrolein, and combinations thereof.

Embodiment 4: The aquatic herbicidal formulation of any of Embodiments 1-3, wherein the at least one nutrient-binding ingredient is functional for use in aquatic sites.

Embodiment 5: The aquatic herbicidal formulation of any of Embodiments 1-4, wherein the at least one functional additive is selected from the group consisting of aluminum sulfate, polyaluminum chloride, aluminum chlorohydrate, aluminum oxides, aluminum hydroxide, iron chloride, iron oxides, polyferric sulfate, calcium chloride, calcium carbonate, calcium sulfate, calcium oxides, lanthanum chloride, lanthanum oxides, lanthanum-modified clay, aluminum-modified clay, iron-modified clay, fly ash, biochars, activated carbon, zeolite, calcium silicate, sorbulite, polonite, bauxite, clays, chiton, polymers (such as polyacrylamides, polyamines, and/or polyacrylates), resins, proteins, enzymes, bacteria, and combinations thereof.

Embodiment 6: The aquatic herbicidal formulation of any of Embodiments 1-5, wherein the at least one functional additive further includes at least one adjuvant. Embodiment 7: The aquatic herbicidal formulation of Embodiment 6, wherein the at least one adjuvant includes at least one surfactant. Embodiment 8: The aquatic herbicidal formulation of Embodiment 7, wherein the at least one surfactant is selected from the group consisting of at least one non-ionic surfactant, at least one anionic surfactant, at least one cationic surfactant, at least one amphoteric surfactant, and combinations thereof.

Embodiment 9: The aquatic herbicidal formulation of Embodiment 7 or 8, wherein the at least one surfactant is selected from the group consisting of alkanoamides, amine oxides, ethoxylated primary and secondary alcohols, ethoxylated alkylphenols, ethoxylated fatty esters, sorbitan derivatives, glycerol esters, propoxylated and ethoxylated fatty acids, alcohols, alkyl phenols, alkyl glucoside glycol esters, polymeric polysaccharides, sulfates and sulfonates of ethoxylated alkylphenols, polymeric surfactants, ethoxylated amines and amides, sulfosuccinates and sulfosuccinate derivatives, phosphate esters, amine surfactants, betaine derivatives, and combinations thereof.

Embodiment 10: The aquatic herbicidal formulation of Embodiment 6, wherein the at least one adjuvant is selected from the group consisting of crop oils, crop oil concentrates, methylated seed oils, quaternary ammonia compounds, d-limonene, peptides, and combinations thereof.

Embodiment 11: The aquatic herbicidal formulation of any of Embodiments 1-11, wherein the at least one functional additive is configured to bind at least one of nitrogen and phosphorus within a target organism. Embodiment 12: The aquatic herbicidal formulation of Embodiment 11, wherein the target organism is an aquatic plant. Embodiment 13: The aquatic herbicidal formulation of Embodiment 12, wherein the target aquatic plant is at least one of a vascular plant and a charophyte.

Embodiment 14: An herbicidal formulation comprising: an active ingredient having herbicidal activity against vascular aquatic plants; and at least one functional additive, the at least one functional additive including: at least one nutrient-binding ingredient, the at least one nutrient-binding ingredient being configured to bind at least one of nitrogen and phosphorus released from a tissue of a vascular aquatic plant; and at least one adjuvant. Embodiment 15: The aquatic herbicidal formulation of Embodiment 14, wherein the at least one adjuvant includes at least one surfactant.

It will be appreciated by persons skilled in the art that the present invention is not limited to what has been particularly shown and described herein above. It should be understood that various aspects disclosed herein may be combined in different combinations than the combinations specifically presented in the description and the accompanying drawings, and are not limited by the specific examples or embodiments described herein. A variety of modifications and variations are possible in light of the above teachings without departing from the scope and spirit of the invention.

What is claimed is:

1. An aquatic herbicidal formulation comprising:
at least one active ingredient having herbicidal activity, the at least one active ingredient being present in an amount sufficient to cause death in a target plant when the aquatic herbicidal formulation is applied to the target plant, the at least one active ingredient including endothall; and
at least one non-herbicidal functional additive, the at least one non-herbicidal functional additive including elemental lanthanum, the at least one non-herbicidal functional additive being present in an amount sufficient to bind to at least one of nitrogen and phosphorus that is released from the target plant when the aquatic herbicidal formulation is applied to the target plant.

2. The aquatic herbicidal formulation of claim 1, wherein the at least one non-herbicidal functional additive further includes at least one adjuvant.

3. The aquatic herbicidal formulation of claim 2, wherein the at least one adjuvant includes at least one surfactant.

4. The aquatic herbicidal formulation of claim 3, wherein the at least one surfactant is selected from the group consisting of at least one non-ionic surfactant, at least one anionic surfactant, at least one cationic surfactant, at least one amphoteric surfactant, and combinations thereof.

5. The aquatic herbicidal formulation of claim 3, wherein the at least one surfactant is selected from the group consisting of alkanoamides, amine oxides, ethoxylated primary and secondary alcohols, ethoxylated alkylphenols, ethoxylated fatty esters, sorbitan derivatives, glycerol esters, propoxylated and ethoxylated fatty acids, alcohols, alkyl phenols, alkyl glucoside glycol esters, polymeric polysaccharides, sulfates and sulfonates of ethoxylated alkylphenols, polymeric surfactants, ethoxylated amines and amides, sulfosuccinates and sulfosuccinate derivatives, phosphate esters, amine surfactants, betaine derivatives, and combinations thereof.

6. The aquatic herbicidal formulation of claim 2, wherein the at least one adjuvant is selected from the group consisting of crop oils, crop oil concentrates, methylated seed oils, quaternary ammonia compounds, d-limonene, peptides, and combinations thereof.

7. The aquatic herbicidal formulation of claim 1, wherein the at least one non-herbicidal functional additive is configured to bind at least one of nitrogen and phosphorus that is released from the target plant, the binding occurring within the target plant and/or in water at least partially surrounding the target plant.

8. The aquatic herbicidal formulation of claim 7, wherein the target plant is an aquatic plant.

9. The aquatic herbicidal formulation of claim 8, wherein the target aquatic plant is at least one of a vascular plant and a charophyte.

10. The aquatic herbicidal formulation of claim 1, wherein the aquatic herbicidal formulation includes approximately 40% endothall and approximately 28% lanthanum.

11. An herbicidal formulation comprising:
an active ingredient, the active ingredient being present in an amount sufficient to cause herbicidal activity against vascular aquatic plants, the active ingredient including endothall present in an amount of between approximately 20% and approximately 55%; and
at least one non-herbicidal functional additive, the at least one non-herbicidal functional additive including:
at least one nutrient-binding ingredient, the at least one nutrient-binding ingredient including elemental lanthanum present in an amount of between approximately 25% and approximately 55% and being a sufficient amount to bind at least one of nitrogen and phosphorus released from tissue of a vascular aquatic plant; and
at least one adjuvant.

12. The herbicidal formulation of claim 11, wherein the at least one adjuvant includes at least one surfactant.

13. The herbicidal formulation of claim 11, wherein:
the active ingredient is present in an amount of approximately 40%; and
the at least one nutrient-binding ingredient is present in an amount of approximately 29%.

14. An aquatic herbicidal formulation comprising:
at least one active ingredient, the at least one active ingredient being present in an amount sufficient to cause death of at least one target aquatic plant when the aquatic herbicidal formulation is applied to the at least one target aquatic plant, the at least one active ingredient including endothall and being present in an amount of approximately 40% of the aquatic herbicidal formulation; and at least one non-herbicidal functional additive, the at least one non-herbicidal functional additive being configured to bind free reactive phosphorus released from the at least one target aquatic plant as a result of an application of the aquatic herbicidal formulation to the at least one target aquatic plant, the at least one non-herbicidal functional additive including lanthanum chloride, the at least one non-herbicidal functional additive being present in an amount of approximately 29% of the aquatic herbicidal formulation that is sufficient to bind at least 10% of the free reactive phosphorus released from the at least one target aquatic plant.

* * * * *